(12) United States Patent
Doney et al.

(10) Patent No.: US 12,244,437 B2
(45) Date of Patent: Mar. 4, 2025

(54) METHOD, APPARATUS, AND COMPUTER-READABLE MEDIUM FOR TRANSACTION MANAGEMENT SPANNING MULTIPLE HETEROGENEOUS COMPUTING NETWORKS

(71) Applicant: SECURRENCY, INC., Annapolis, MD (US)

(72) Inventors: George Daniel Doney, Severna Park, MD (US); Dennis O'Connell, Garden City, NY (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 432 days.

(21) Appl. No.: 17/876,139

(22) Filed: Jul. 28, 2022

(65) Prior Publication Data

US 2022/0385499 A1 Dec. 1, 2022

Related U.S. Application Data

(63) Continuation-in-part of application No. 17/174,529, filed on Feb. 12, 2021, now abandoned, which is a
(Continued)

(51) Int. Cl.
*H04L 12/46* (2006.01)
*G06F 16/23* (2019.01)
(Continued)

(52) U.S. Cl.
CPC ...... *H04L 12/4633* (2013.01); *G06F 16/2379* (2019.01); *G06F 16/9024* (2019.01);
(Continued)

(58) Field of Classification Search
CPC . H04L 12/4633; H04L 45/14; G06F 16/2379; G06F 16/9024; G06Q 20/36; G06Q 30/0283
See application file for complete search history.

(56) References Cited

U.S. PATENT DOCUMENTS 10,193,696 B2  1/2019  Struttmann et al.
11,194,837 B2  12/2021  Vo et al.
(Continued)

*Primary Examiner* — Scott C Anderson
(74) *Attorney, Agent, or Firm* — NEO IP

(57) ABSTRACT

A method and system for interfacing heterogenous computing networks to accomplish a cross-network that spans at least two networks and has a source node and a destination node. A graph structure is traversed to define a transaction path. The graph structure includes transaction nodes within transfer networks and bridges that span networks. Each node in the graph structure exists on a network and has an associated set of attribute variables that specify supported tokens. A bridge path defined by two nodes spanning two logical networks is determined. The source node and the destination node are also connected via one or more out of band network paths which are separate from the bridge path. Disclosed implementations link the speed and convenience of P2P conversion models with B2B trading channels using a ledger-agnostic overlay and computing architecture to enable value transfers and conversion spanning dissimilar digital communication networks.

38 Claims, 22 Drawing Sheets

Related U.S. Application Data continuation of application No. 16/861,315, filed on Apr. 29, 2020, now Pat. No. 11,038,718.

(60) Provisional application No. 63/226,204, filed on Jul. 28, 2021, provisional application No. 62/839,971, filed on Apr. 29, 2019.

(51) Int. Cl.
*G06F 16/901* (2019.01)
*G06Q 20/36* (2012.01)
*G06Q 30/0283* (2023.01)
*H04L 45/00* (2022.01)

(52) U.S. Cl.
CPC ......... *G06Q 20/36* (2013.01); *G06Q 30/0283* (2013.01); *H04L 45/14* (2013.01)

(56) References Cited

U.S. PATENT DOCUMENTS

| | | |
|---|---|---|
| 11,301,460 B2 | 4/2022 | Rich et al. |
| 11,488,147 B2 | 11/2022 | Sheng et al. |
| 11,488,161 B2 | 11/2022 | Soundararajan et al. |
| 11,551,191 B2 | 1/2023 | McNamara et al. |
| 2018/0262327 A1* | 9/2018 | Jain ................... H04L 12/40013 |
| 2019/0199617 A1* | 6/2019 | Kalyanasundharam ..................... G06F 13/364 |
| 2020/0183859 A1* | 6/2020 | Johns .................. H04L 67/1097 |
| 2021/0042735 A1 | 2/2021 | Majidi et al. |
| 2021/0192501 A1 | 6/2021 | McNamara et al. |
| 2022/0270080 A1 | 8/2022 | Yantis et al. |

* cited by examiner

METHOD, APPARATUS, AND COMPUTER-READABLE MEDIUM FOR TRANSACTION MANAGEMENT SPANNING MULTIPLE HETEROGENEOUS COMPUTING NETWORKS

RELATED APPLICATION DATA

This application claims priority to U.S. Provisional Application No. 63/226,204 filed on Jul. 28, 2021. This application is a continuation-in part of U.S. application Ser. No. 17/174,529 which is a continuation of U.S. application Ser. No. 16/861,315, which claims priority to U.S. Provisional Application No. 62/839,971 filed on Apr. 29, 2019, the entire disclosures of which are incorporated herein by reference.

FIELD OF THE INVENTION

The invention relates to transaction management for value transfers and conversions transacted over multiple heterogenous computing networks transactions are sustained asynchronously by larger aggregated transactions.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Uniswap, Balancer, and Curve Finance are popular instantiations of Automated Market Making (AMM) algorithms on decentralized computing platforms, such as blockchain networks. AMMs provide network participants a convenient mechanism to convert assets in one form into another. For most AMMs, asset conversion is performed using a pool of available assets which are traded for the asset which is to be converted and transferred to the counterparty desiring the conversion. AMM algorithms set the price and execute the conversion providing a network communication path to conduct transactions which convert one asset to another. But these providers all struggle to provide sufficiently high liquidity at large scale or in the face of large one-way demand for conversions. The term "liquidity", as used herein, refers to the efficiency with which one asset can be converted to another.

For AMMs, supporting liquidity requirements for larger transactions requires greater asset reserves which in turn increases both the cost of operations due to the cost of asset capital and the operational risk due to asset volatility. Providers of liquidity services relentlessly seek mechanisms to reduce the cost of operations, specifically mechanisms to become capital efficient by reducing the amount of capital required on hand to support a given market liquidity.

One mechanism to reduce the amount of capital required to support liquidity operations is to have a mechanism for replenishing depleted asset reserves to counteract the impact of a large trade or mismatched one-way flow of one asset to another by converting the asset in surplus to the asset in deficit. But, if insufficient demand for the reverse conversion isn't present in the same network, the pool must seek liquidity, through asset conversion, in a different network.

In an earlier disclosure, the Applicant identified a mechanism to facilitate transfer or conversion of value by connecting dissimilar networks using a bridging mechanism. In am implementation of this approach, a bridging mechanism can be made more capital efficient by linking the bridge nodes to dissimilar networks to provide additional liquidity from new sources if the liquidity of the principal bridge is challenged. This approach enables more capital efficient conversion operations by reducing the need for asset inventory by connecting dissimilar liquidity sources.

While convenient and fast, many peer to peer (P2P) conversion models, especially blockchain conversion tools like AMMs, provide limited liquidity when compared to institutional, that is business to business (B2B), trading networks some of which are characterized by efficient transactions of trillions of dollars of value daily. But institutional trading networks are efficient due to the large value amount of transactions (fees being small in comparison) not the cost of an individual transaction. In fact, most institutional trading networks won't accept small orders. By linking the speed and convenience of P2P conversion models using the disclosed method to B2B trading models using a value transfer framework for dissimilar networks, it is possible to create convenient, fast, scalable, capital efficient conversion networks.

SUMMARY

The disclosed implementations provide a mechanism to enhance the liquidity of cross network value conversions using a set of linked network transfers connecting market platforms. For simplicity, the terms "transfer" or "network transfer" as used herein include any type of movement, conversion, or transformation of value. While distributed ledger technologies (DLT) simplify the transmission of value within a network, most transactions involve more than one ledger—demanding a scalable, repeatable framework to record transactions that affect more than one ledger. Disclosed implementations orchestrate cross-ledger transactions, streamline the hypothecation and transmission of value, track assets and obligations across heterogenous systems, simplify regulatory oversight, and maintain necessary liquidity across the underlying ecosystems.

The disclosed implementations include a ledger-agnostic overlay network designed to span the range of digital transfer networks including transaction only DLT networks like Bitcoin's DLT, smart contract based DLT like Ethereum, and also traditional centralized computing systems so that value transfers can be made within and across them, traversing heterogeneous jurisdictional boundaries, payment networks, banking systems, public and private distributed ledgers, internal corporate accounting systems, exchanges, and more.

Disclosed implementations include a Finance Ontology, that is a syntax-independent model of financial transactions including value transfers, a catalog of transfer messaging terms and associated items, and a translation schema to convert heterogeneous implementations to the applicant's syntax-independent model.

Disclosed implementations also include a Transaction Service Bus (TSB) module that decouples the detail of individual value transfer systems (e.g., DLTs, payment networks, banking systems) by providing global interfaces for the movement and reconciliation of value (and other financial transactions).

When a cross-network transaction is proposed, the TSB module inspects proposed transactions and engages a Route Planning Service to discover potential value transfer paths from source to ultimate recipient using a series of chained sub-transactions between and across transfer providers. The sender (or sender's representative which may be an artificial intelligence engine) may then choose the preferred route based on preferences for speed, cost, or reliability.

The sender then authorizes the preferred choice and engages the Chained Transfer Handler module to engage any wrapped transfer system and thereby manage the transmission of value through dissimilar networks. Alternatively, the transaction can be initiated by an external source sending value to the inbound source wallet with delivery instructions. A Route Planning Service module is executed to determine an optimized transfer path including a chain of multiple sub-transactions and a Chained Transfer Handler executes the transactions in a controlled manner.

Pairs of nodes in the graph structure and the corresponding sets of attribute variables can define a bridge data structure providing a procedural linkage between the nodes in the pairs of nodes, wherein at least some of the pairs of nodes correspond to accounts in different networks.

The bridge data structure can specify at least one source wallet, at least one destination wallet, supported units of value, and a transaction pricing model for transaction communication flowing between nodes in the pair of nodes. The bridge data structure can specify transformation logic to be attached to the logical interfaces.

The generation of transaction routing information can include traversing the graph structure in accordance with a node traversing algorithm and parsing the attribute variables. Transfer details for the overarching chain transfer with linkages to each sub-transaction can be published on a distributed ledger that can be separate from the transfer networks that are traversed.

One aspect of the invention is a method for interfacing heterogenous computing networks and transfer providers to accomplish a transformation transaction with enhanced liquidity. The phrase "transformation transaction" or "conversion transaction", as used herein, refers to a transaction where value starts in one form, such as a specific currency or asset, and changes form to a different currency or asset as it traverses one or more computing networks, and where the "transformation" or "conversion" from one form to another uses the traversal model of a cross-network transaction. The method comprises bridge data structure containing a source and destination bridge node, the source node managing value in its originating form and the destination node managing value in its delivery form the bridge managing value conversion rates for transactions that traverse the bridge.

Network traversal transactions include hypothecation and settlement transactions. A hypothecation transaction (also known as a "deposit transaction") is a transaction in which assets from one network are transferred to another network by locking the value on the source network and replicating its ownership on another network. A settlement transaction (also known as a "withdrawal transaction") is essentially the opposite of a hypothecation transaction in that value on the source network representing the ownership right is returned, resulting in the release of the underlying value on the destination network. These transactions are referred to herein as "anchor transactions" since the network containing the value in its underlying form anchors transactions on the hypothecated network. Similarly, conversion transactions allow the traversal of networks by changing one form of value into another at a conversion rate or price. Conversions are achieved by maintaining an inventory of assets in nodes on each network that are released as part of a conversion transfer. In finance, a secondary market is one in which peer to peer (P2P) conversions are affected.

To sustain scalable secondary market operations efficiently and with minimal capital costs, it is beneficial to link and aggregate P2P conversion transactions with larger scale primary market transactions (business to business). This can be accomplished by automating an "out of band replenish model", such as the model disclosed in U.S. Patent Publication No. 2017/0213289, in which market liquidity requirements are met by replenishing pools of liquid assets in an automated manner. As disclosed herein, such replenishment can be accomplished with one or more bridge transactions to maintain the inventory required to operate the secondary market. For example, if an imbalance occurs in the inventory of the market making pool of the secondary market due to significant demand for the conversion of one asset to another, the asset in excess (often tokenized) can be converted to its underlying asset (often digital [non-tokenized]) using the withdrawal (also known as settlement) bridge using the disclosed implementations. The resulting asset may be converted in scalable and deep institutional markets via a primary market (business to business) transaction to the asset that is in deficit using a conversion bridge as disclosed. The resulting asset (often digital) may be converted to the asset (often tokenized) using the deposit (also known as hypothecation) bridge using the disclosed method. By linking markets (in this case primary and secondary markets) in this way, the liquidity of secondary (peer to peer) markets seeking convenient near-real time transactions can be maintained even if conversions are imbalanced without the requirement to maintain substantial and costly inventory.

Disclosed implementations include an order routing system as part of the TSB that can route proposed conversion transactions via the primary market path in the event secondary bridge liquidity is insufficient to support the transaction. Disclosed implementations include the incorporation of lending to provide alternative paths to supplement secondary market liquidity. By permitting long and/or short positions in bridge node asset management, this approach is used to reduce market exposure of bridge node operators who must maintain an inventory of liquid assets to support network conversions. Disclosed implementations leverage logistics and supply chain management logic to provide an optimal inventory system for capital efficiency. A dynamic pricing model can be applied to manage transaction flows to maintain a desired level of liquidity.

DETAILED DESCRIPTION

Figure 1:
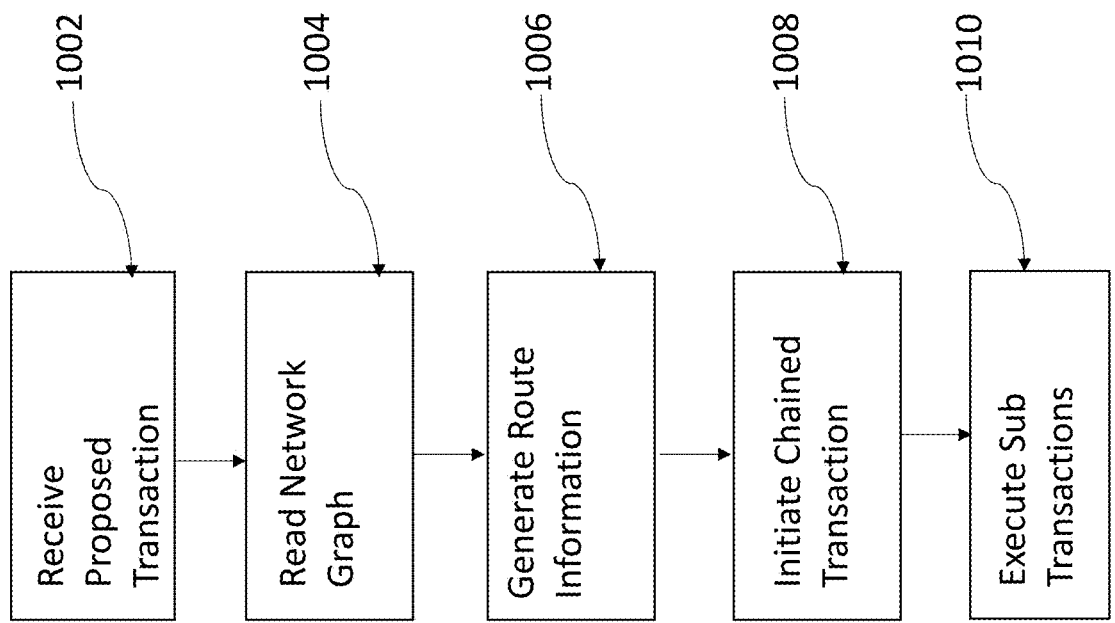
FIG. 1 is a flow chart of a method for providing communications between dissimilar networks in accordance with disclosed implementations.

FIG. 1 illustrates a method of interfacing heterogenous DLT systems for conducting a transformation transaction in accordance with a disclosed implementation. At 1002, information is received describing a desired/requested cross ledger transaction that spans at least two dissimilar networks, such as two different DLT networks. At 1004 a multi-network graph structure is read. The graph structure can be created by crawling nodes corresponding to bridges that span networks. Each node in the graph structure can have an associated set of attribute variables as node metadata. The attribute variables can include units of value (tokens) native to the corresponding network, identification of smart contracts implementing the tokens, wallets or accounts used for bridging, value sources available to the user, and API's and network interfaces to other networks. At 1006 transaction routing information is generated for effecting the transaction by traversing the graph structure in accordance with a node traversing algorithm and detecting bridge nodes that facilitate the desired transaction. At 1008, a transfer path is selected by the source based on preferences using the transaction routing information and the transfer is initiated. The desired transfer path can include a chained set of sub-transactions that ensures proper execution of the requested cross ledger transaction. At 1010 sub-transactions are executed using the specified interfaces to achieve the cross-network transaction. Sub-transactions are executed on heterogeneous networks using an ontology mapping that converts syntax-independent execution instructions to specific instructions recognized by the underlying transfer network. The overarching transaction and all sub-transactions can be recorded on a ledger, that may be distinct from the ledgers involved in sub-transactions. The independent ledger may utilize zero knowledge proofs to provide immutability while maintaining transaction privacy. Note that the chains of sub-transactions can include transactions in the source network, the destination network and other networks that serve to as connections between the source network and destination network.

Figure 2:
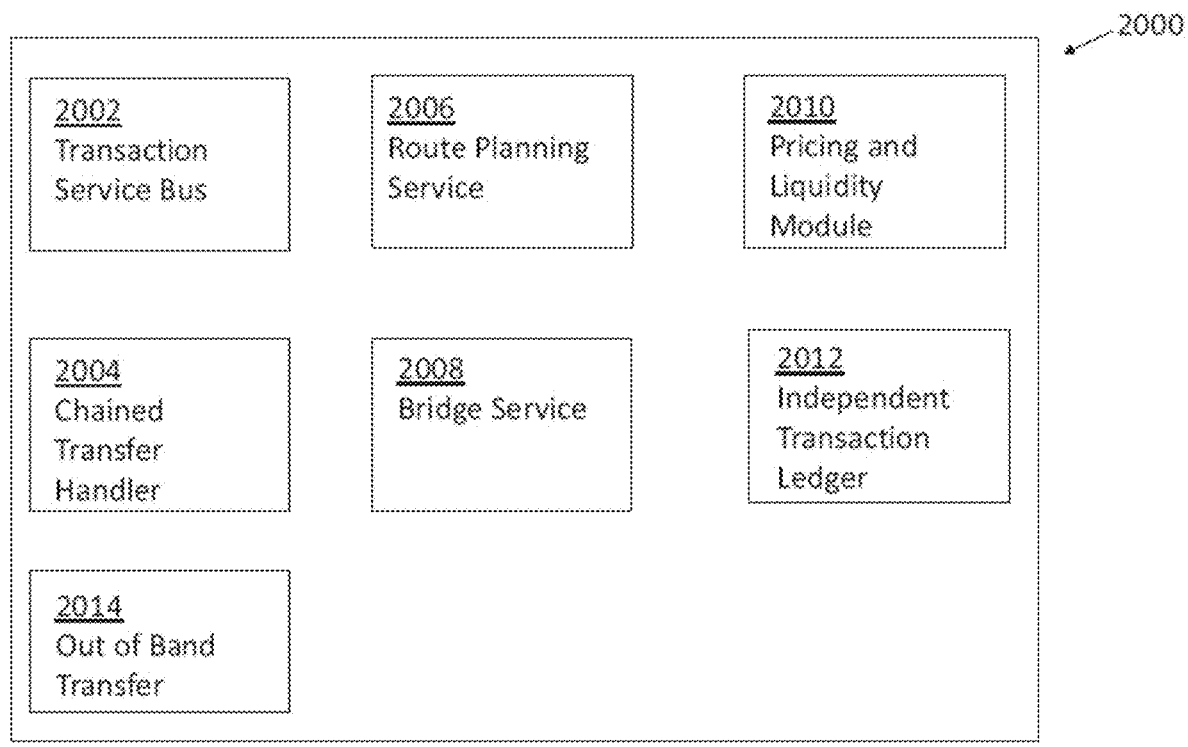
FIG. 2 is a schematic diagram of a computer architecture for providing communications between dissimilar networks in accordance with disclosed implementations.

FIG. 2 schematically illustrates a computer architecture in accordance with a disclosed implementation for accomplishing the method of FIG. 1 and other transformation transfers. The architecture 2000 consists of Transaction Service Bus module 2002, Chained Transfer Handler module 2004, Planning Service module 2006, Bridge Service module 2008, Pricing and Liquidity module 2010, Independent Transaction Ledger module 2012, and Out-Of-Band Transfer/Replenishment module 2014. Each module of architecture 2000 can communicate with the others as necessary through a networked computing environment.

The modules described herein can be implemented as computer executable code within a single computer processing unit or multiple computer processing units. One or more of the modules may be implemented remotely from the other modules in a distributed architecture. The description below of the functionality provided by the different modules is for illustrative purposes, and is not intended to be limiting, as any of modules may provide more or less functionality than is described. For example, one or more of modules may be eliminated, and some or all of its functionality may be provided by other ones of modules.

As described above, automated execution of transformation transaction, such as an inter-network (cross-ledger) transaction, is accomplished in response to receiving a transaction data structure specifying the details of a proposed cross ledger transaction, such as a value transfer. The data structure can include transaction details (e.g., source, destination, amount, currency) and can be created by a party with the authority to initiate the transfer. For example, the transaction data structure could be (TransactionType=Transfer, TransactionCurrency=Ether, Source=[wallet 1 address], Destination=[wallet 2 address]).

Transaction Service Bus module 2002 parses the transaction data structure and determines, based on the graph, one or more viable paths (including expected pricing, fees, and transaction times) for traversing multiple networks to execute the specified transaction. The path determination is made based upon a model of the networks determined by Route Planning Service module 2006 (in the manner described in detail below) and includes a transaction chain consisting of multiple sub-transactions, each sub transaction having a source and a destination. If asset transformation is required on a path, Pricing and Liquidity module 2010 specifies the ratio between the source and destination assets required for a bridge traversal based on bridge metadata (described below). Chained Transfer Handler module 2004 executes the sub-transactions (with Zero Knowledge Proofs, as desired to protect privacy) as a sequence of network transfers, confirmations, and bridge traversals (as specified by Bridge Service module 2008 described below) to ultimately affect the value transfer of the specified transformation transaction. Out of Band Transfer module 2014 can be used to include non-network (manual or un-instrumented) transfers. Out of Band Transfer 2014 module is used to rebalance account resources, as needed, based on the consumption of liquidity in the sub-transactions. Transaction records can be recorded by Independent Transaction Ledger module 2012. Disclosed implementations can leverage the compliance framework described US Published Patent Application No. US20190164151 A1 to safeguard cross ledger transactions and conduct compliance verification on dissimilar networks.

The model of the networks noted above is created by Route Planning Service module 2006 utilizing a multi-agent system that crawls various networks (which may be expected to participate in a cross ledger transaction) and bridge node to identify a viable path for the transfer of value between the source and destination. The inter-network topology can be stored as a graph structure of nodes. The node attribute variables are described in greater detail below and can include descriptions of value units (tokens) native to the particular network, traversal methods, accounts used for bridging, fees and pricing methods, and associated API's and network interfaces for the purposes of communication with external sources.

Figure 3A:
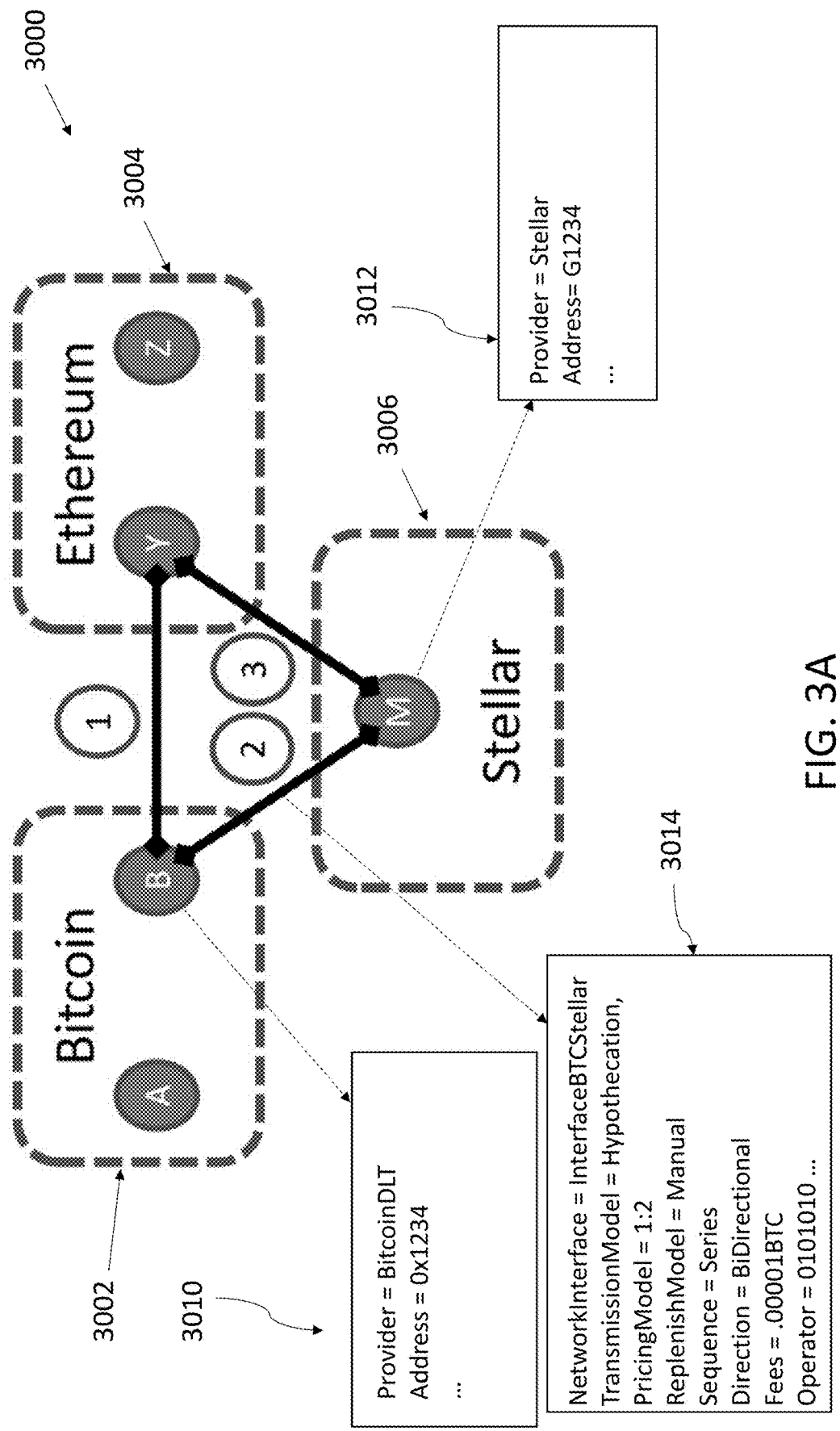
FIG. 3A is a schematic illustration of a node graph in accordance with disclosed implementations.

FIG. 3A is a schematic diagram of an abstraction of a simple graph structure 3000, traversed by the Route Planning Service module 2006, of an inter-network topology in accordance with an implementation. For example, Network 3002 can be the Bitcoin blockchain, network 3004 can be an Ethereum protocol blockchain, and network 3006 can be a Stellar protocol blockchain. In FIG. 3A, three dissimilar networks (3002, 3004, and 3006) are illustrated however, any number of or any type of dissimilar networks can be included in implementations. In FIG. 3A, each network has an illustrated bridge node, each node representing one side of a Bridge that provides communication between networks. Node B is a bridge node in DLT network 3002, node M is a bridge node in DLT network 3006, and Node Y is a bridge node in DLT network 3004. Each bridge node corresponds to an account/wallet in the corresponding DLT network. A pair of bridge nodes Bridge. For example, nodes B and M define a Bridge between DLT network 3002 and DLT network 3006. Each bridge node has a corresponding metadata record indicating the above-noted set of attribute variables. Further, bridge characteristic data is stored as bridge metadata. Each pair of bridge nodes connected with a line in FIG. 3A, and the associated metadata (node metadata and bridge characteristic metadata) defines a Bridge. Of course, there can be any number of nodes and bridge nodes in the graph (typically thousands) and FIG. 3 is a simple graph for illustrative purposes.

Figure 3B:
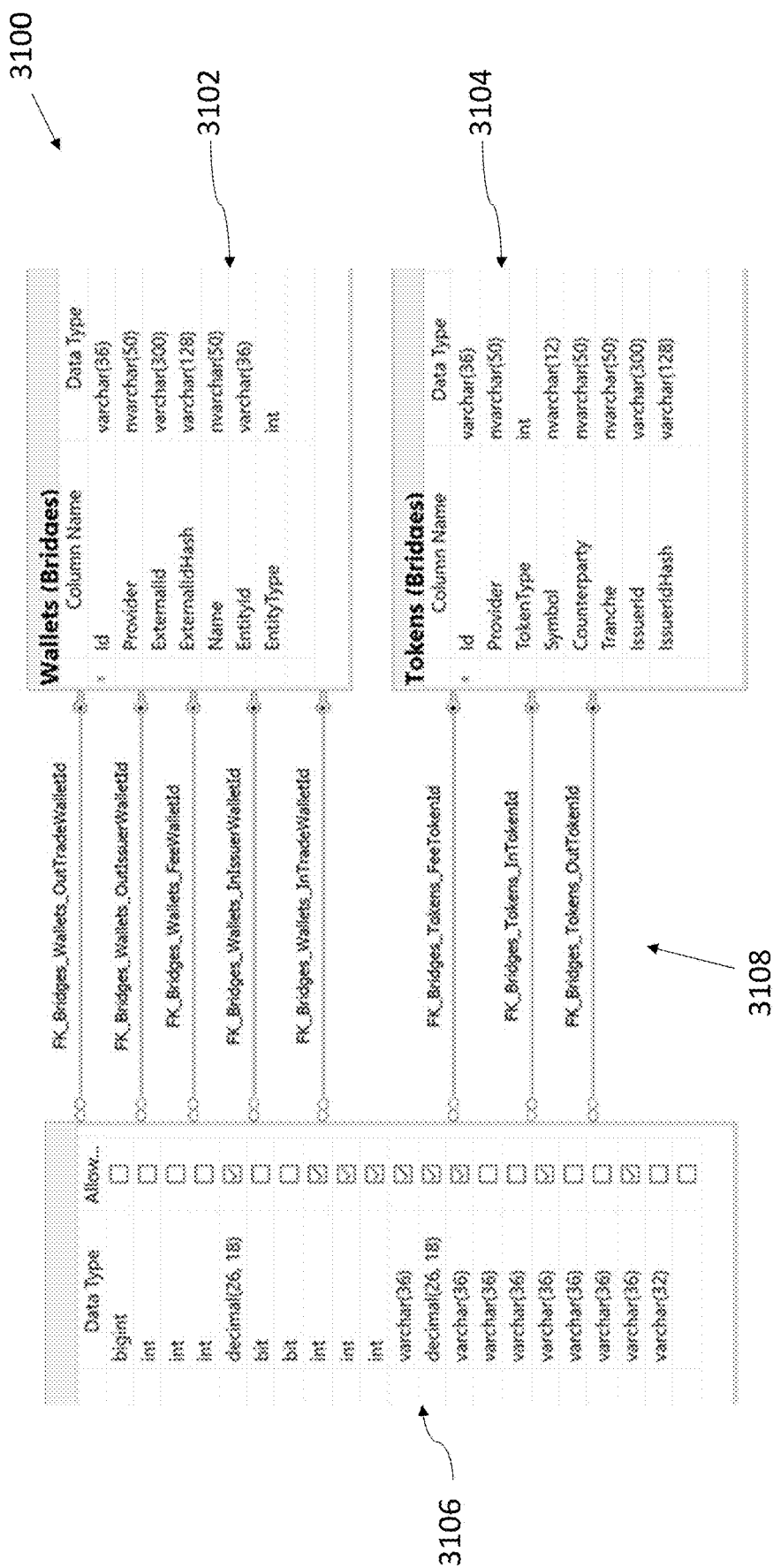
FIG. 3B is a schematic illustration of a bridge metadata schema

As an example, metadata record 3010 is stored in association with node B, metadata record 3012 is stored in association with node M and bridge characteristic metadata record 3014 is stored to define the connection between node B and node M. Therefore, a Bridge is defined by metadata records 3010, 3012, and 3014 (collectively bridge metadata") of graph structure 3000. A more detailed schema 3100 of the bridge metadata, in accordance with an implementation, is shown in FIG. 3B. Schema 3100 includes wallet attributes 3102 (which can be stored in the graph as node metadata), token attributes 3104 (which can be stored in the graph as node metadata), data type attributes 3106 (which can be stored in the graph as bridge characteristic metadata), and interfaces 3108 (which include pricing models and other logic and which can be stored in the graph as bridge characteristic metadata). While metadata records 3010, 3012, and 3014 of FIG. 3A are illustrated as three distinct records, the data therein can be combined into a single record of bridge metadata or divided over additional records based on the architecture of graph 3000. Disclosed implementations use a standard schema for specifying the metadata. Bridges serve as connection paths between dissimilar networks. The graph allows transaction paths to locate and use Bridges in cross-ledger transaction chains (or in certain cases in intra-ledger transactions as discussed below. The metadata records 3010, 3012, and 3014 is discussed in greater detail below in connection with Bridge functions.

The data in graph 3000 is stored by the Bridge Service module 2008 and traversed by the Route Planning Service module 2006 Transaction Service Bus module 2002 provides optimized transaction routing information, including sub transactions required to effect the transformation transaction. When presented the routes, the source account can initiate a chained transaction, based on the graph and user preferences such as one or more of transaction time, conversion rates and fee load. Chained Transfer Handler module 2004 manages transaction execution including the proposed sub transactions to ensure proper transfer execution (or rollback) through ultimate delivery. Route planning and path optimization are described in greater detail below.

Transaction Service Bus module 2002 implements a finance ontology, that serves as a syntax-independent model of value transfers, a catalog of transfer messaging terms and associated items, and a translation schema to convert heterogeneous implementations of the various networks to the syntax-independent model. Chained Transfer Handler module 2004, executes sub-transactions on heterogeneous networks via the Transaction Service Bus module 2002 which translates the proposed sub-transactions from the syntax-independent instructions to the network specific implementation.

The finance ontology is an abstraction layer that provides a common language for financial transactions. The ontology defines interfaces for the services, functions, and objects encountered in financial systems. The ontology provides an interoperability layer isolating the differences between the implementations of individual service providers providing for a flexible modular system where individual components are loosely coupled. The ontology makes it possible to compose individual financial services into complex financial systems even if individual services are not designed to work together. Since payment chaining is designed to connect any transfer network to any other transfer network, the common service definition reduces the complexity of the interconnecting N systems from N factorial (N!) to N. Thus, the ontology is designed to make large integrations tractable. Standard functions and interfaces of the technology are discussed below.

However, developing a common abstraction for each underlying provider for the sake of tractability may reduce the expressivity (that is, special features that can be exposed by unique providers) of individual providers. The disclosed framework has two mechanisms to ensure that expressivity is not lost for tractability. First, "wrappers" may expose features that are unique to a specific provider/network or to a subclass of providers/networks. In this case, dependent clients may interface directly with the an implementation specific wrapper to leverage these unique features. However, this creates a direct dependency between the client and service implementation that tightly couples the client to the service implementation limiting modularity and scalability. The implementer may decide if the tradeoff to gain unique functionality is worth the increased dependency on a specific provider/network. Additionally, the ontology includes a data structure that enables additional data with a locally defined specification to be carried in a general-purpose interface. The core data structures include an OtherData field that has a specification that includes type and data information enabling parsers to inspect the data and parse it if the format is recognized. This structure enables point to point communications between systems that may require additional data to be carried in structures used by all parts of the system. As a result, coordinating functions, like those exhibited in the Chained Transfer Handler, can perform functions at global scope without sacrificing the unique features of specific transfer providers.

As noted above, Bridge Server module 2008 provides logical interfaces, Bridges, between the various DLT networks and relays transactions and value between them. Bridges can accommodate token types representing dissimilar assets and units of value. Bridge server module 2008 implements the Bridges to create a logical cross-ledger connection based on the model and node metadata. Essentially a Bridge is a data structure that defines the transfer behavior. Bridge Server module 2008 reads the metadata records 3010, 3012, and 3014 (FIG. 3) and determines bridge type, assigns Vostro wallet(s), assigns Nostro wallets, identifies fees, determines pricing models, assigns out-of-band replenish as necessary, and identifies and attaches transformation logic in the manner set forth below. A bridge operator, that is an entity or system process with appropriate permissions to operate via both networks spanned by a bridge can be indicated in the metadata record 3014. Bridging accounts are created or assigned to link the source and destination networks. The source account in a Bridge is often a custody account and should be active for two-way bridge support and the destination should be active and may require a linked issuer for certain types of transfers.

Various classes of Bridges can be created and stored by Bridge Service module 2008, with a range of options in price discovery (pegs, floats, exchanges), accounting (translation, indenture), and transfer (in band, out of band). These classes provide common interconnectivity patterns facilitating repeatable processes to execute and record the movement of value between networks. A contained bridge class is composed of options in areas such as price discovery, accounting, and transfer (e.g., in-band and out-of-band combinations), as specified by the metadata model. Dissimilar networks are connected together using Bridges and thus Bridges facilitate the flow of value between networks and can extracting a toll for the service, as specified by the metadata. Bridges create connections between networks or units of value that receive and relay value transfers across different transmission networks by controlling:

i. Transmission mode: hypothecation (by reference), settlement (by value), linkage, or trade—transformation (changing, splitting the assets)
ii. Pricing: exchange, algorithmic, pegging
iii. Synchronicity: Synchronous or asynchronous (with hedging & risk management)
iv. Fee, capital supply logistics, and liquidity management Each Bridge includes an inbound account and an outbound account (associated with, for example, nodes B and M respectively in FIG. 3. The accounts can be owned by the bridge operator with "system" permissions to be operated as part of a transaction chain. These accounts are provided as configuration parameters in the bridge metadata during the creation of the Bridge. The value units supported by the inbound and outbound accounts defines the connections supported by the Bridge. Supported connections are necessary for transfer routing. Using the example of FIG. 3 where a transaction originates in the Bitcoin Ledger (DLT network 3002) and crosses into the Stellar Network (DLT Network 3006), the inbound (Vostro) Account of the Bridge (for example B in FIG. 3) becomes the destination account for the initial sub payment in the transaction chain. This account does not need to be an "Active" account, that is containing authority to operate unless "rollback" capability is required. The outbound (Nostro) account of the Bridge (for example M in FIG. 3) is used to send value down the chain or to the final destination. The Nostro account should be Active, meaning the processing thread should have the authority to initiate a transaction from the account. For Dark Pool transactions, that is a transaction with prepositioned value, sufficient value must be present in the inbound bridge account prior to initiating the chained transaction. Bridges can be loaded from Bridge Server module 2008 into a list used by Chained Transfer Handler module for route planning and payment execution. The class used to execute the Bridge is determined by the configuration.

The list of possible routes from one wallet type to another wallet given the desired destination value unit can be determined by evaluating the supported tokens, indicated in bridge metadata, for inbound and outbound wallets used by the available Bridges. Route Planning Service module 2006 uses this list when mapping paths from source to destination. For example, graph 3000 of FIG. 3 shows two possible routes between DLT network 3002 and DLT network 3006. The first route is indicated by 2 and the second route is indicated by the combination of 1 and 3.

In addition to Bridge configuration details, operational attributes of Bridge classes are determined by dependency injected details and can be stored as bridge metadata. Variations in Bridge operations in disclosed implementations can be divided into 6 attributes defined in the metadata: Transmission Model, Pricing Model, Replenish Model, Sequence, Direction, and Fees. The Transmission Model defines how ledgers are linked together via bridging wallets. Five types of Transmission Models can be implemented: Hypothecation (Deposit), Settlement (Withdrawal), and Transfer (NostroVostro), Transmute (ledger change), and Transform. The model to be used can be determined based on the desired transfer mode, bridge operator's ability to perform issue/burn operations, the availability of custody wallets, and other business requirements.

The Pricing Model defines the ratio of the number of destination ledger tokens sent for every source token received by the bridge. Pricing Model implementations include: a Link (1:1), a Peg (fixed ratio), Algorithmic (dependency injected plugin), or External (taken from a third-party source such as an exchange). The Replenish Model defines the mechanism used to refill the outbound wallet when excessive unbalanced flow takes place and resources must be repositioned. Replenish Model implementations include; None, Manual, Transfer, and Exchange. Bridges have a Sequence (Series/Parallel) and Direction (Unidirectional/Bidirectional) indicating how they can be executed.

In cases of multi-ledger issuances, Bridges may implement cross-ledger transmutation. This may be used when the official record of ownership is on a separate ledger than the one being used for transfer, or the official record is the sum of ownership records on affected ledgers. Transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger.

For example, funds exiting a ledger are sent to a Source Ledger Base Wallet. This transfer may also be an escrow transaction placing a hold on the tokens without moving them. An equivalent number of tokens are issued into circulation on the Destination Ledger from the Issuer (wallet, account, or smart contract) or Cold Wallet to the Outbound Wallet on Provider B for delivery to the destination. On successful delivery, the IIssuer.Destroy function called on the source ledger removing the tokens from circulation.

Figure 4:
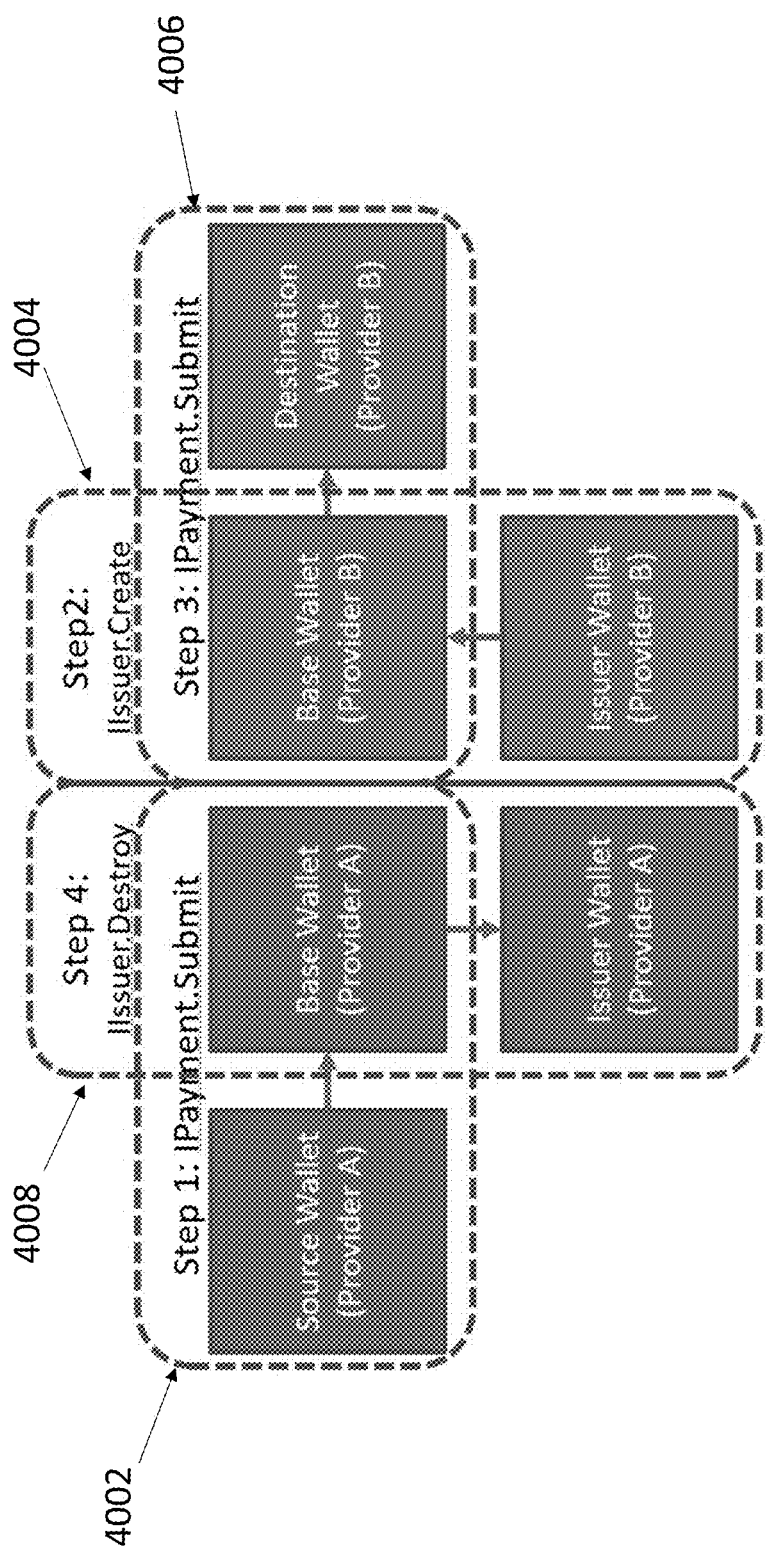
FIG. 4 is schematic diagram of an example of a chain of sub transactions for accomplishing a cross ledger mutation in accordance with disclosed implementations.

An example of a chain of sub-transactions for accomplishing a cross ledger transmutation, that is the creation of one unit of value corresponding with the destruction of another, is illustrated in the flowchart of FIG. 4. An example of a transmutation transaction is the movement of share representing beneficial ownership from one ledger to another. At 4002, Value is sent from Source Wallet to Base (Escrow) Wallet using Provider A. This wallet is the Bridge Inbound Wallet. At 4004, tokens are issued from Provider B Issuer Wallet and sent to the Base Wallet on Provider B (Bridge Outbound Wallet based on Bridge attributes). At 4006, base wallet on Provider B sends value to Destination Wallet on Provider B. At 4008, on transaction completion, equivalent number of tokens are destroyed from Provider A Base Wallet. Note that this process assumes that Chained Transfer Handler module 2004 has a mechanism to detect and attribute transactions on the source and destination ledger and a mechanism to create tokens on Provider B and burn (destroy) tokens from the Base Wallet on Provider A. Access to these authorities can be indicated by bridge metadata. Also, it is possible to skip steps 4004 and 4008 by issuing and burning tokens directly through the issuer wallet.

In some cases, it may be desirable to convert the rights represented in tokens from one form to another. For example, it may be desirable to convert the loan rights represented in a convertible note into an equity position. In this case, a fixed ratio transform (e.g. 1 share debt=1 share equity or 10 shares debt=1 share equity) using the earlier transmute function can be used. However, it may be useful to split rights in a common share into separate tokens that function differently with one representing voting rights and the other representing beneficial ownership of income or equity proceeds. In this case, a custom transaction transform Bridge is required. For each type of token delivered to the inbound wallet, more than 1 type of share may be produced and delivered to the destination. The basic sequence of a Transform transaction is the same as a Transmute transaction, but the Bridge must execute instructions to issue 2 or more types of instruments on the outbound transaction and must deliver each instrument to the desired destination wallet. The reverse transaction may be conducted to combine rights into a new composite right (e.g. combine voting and beneficial ownership into a common share). A transform Bridge can be an intra-ledger bridge, i.e. need not span multiple networks.

Exchange Bridges are a special kind of Bridge where Price Discovery or Movement of funds involves an exchange inline or Out Of Band (OOB). In this case, the amount of funds required for the source transaction depends on the current Total Volume Price (integral of order book) of the equivalent trade on an exchange. Funds are then replenished inline or Out of Band in batch. In some cases, the inbound transfer may be to an exchange account for inline transactions. In this case the Nostro account, would also reside in the exchange. Nostro accounts may use the same provider as the Vostro account if exchange is not available via the Provider network but different currencies are supported. Other types of bridges are discussed below with respect to FIGS. 10 and 11.

The disclosed implementations include Transaction Service Bus (TSB) module 2002, also known as "InfinXchange™", an interface architecture that includes libraries that map and serve interfaces and data structures Transaction Service Busfor DLT and traditional value transfer networks (e.g., Ethereum, PayPal, SWIFT) and value transfer models. As noted above, the interface(s) required by a Bridge can be specified in the Bridge metadata. These interfaces expose the functions required to execute procedures used for transformation transactions. The InfinXchange wrappers implement a hub and spoke model for integration, through which dependent services, like Chained Transfer Handler module 2004, only need to integrate with the required interface once to orchestrate transactions across wrapped transfer networks.

TSB module 2002 can be implemented as an abstraction layer that provides a common interface for intra-ledger transactions. To participate in a cross-ledger transaction as either the source or destination ledger, a transaction provider can be wrapped in an InfinXchange wrapper. The wrapper is an executable that integrates with the underlying transfer provider to execute transactions and react to activity in the network. The wrapper exposes common interfaces as defined in the finance ontology. These interfaces decouple business and transaction logic associated with chaining from the specific implementation details of a transaction provider and permit broad reuse of transaction patterns.

Transaction providers/networks vary broadly in implementation and integration patterns. For example, blockchain networks require a client that interacts with the nodes while many payment networks expose APIs. APIs are implemented using REST, SOAP, RPC, and other patterns. Corporate accounting systems often run on relational databases with no specific pattern for integration. A Transaction Service Bus module library can be developed to integrate with a transaction provider implemented in any of these styles to provide a common pattern for interacting with the underlying service.

TSB module libraries connecting to each provider can be injected into the chained Transfer handler module 2004 using an abstract factory pattern. The abstract factory pattern is a known mechanism for encapsulating a group of individual factories that have a common theme without specifying their concrete classes. For example, client software can create a concrete implementation of the abstract factory and then use the generic interface of the factory to create the concrete objects that are part of the theme. Factory patterns separate the details of implementation of a set of objects from their general usage.

Again, interfaces that define the connections are found in the finance ontology. As a provider is initialized, it publishes its support for service interfaces and functions to the calling service. This enables the calling service to identify the services and methods that are supported by the transaction provider. Using this information, the calling service can determine the eligibility of a provider to support a transaction type. Any provider participating in a chained transaction should support the IPaymentService abstraction. A short list of frequently used services from the Finance Ontology are described below.

IPaymentService: executes all transfers of value. Functions include: estimating costs for a transaction, executing the payment, validating its completion, and obtaining a list of payments from the source IWalletReaderService: identifies account balances (the amount of value available at a particular wallet address) and is used to obtain details about the wallet (e.g., supported currencies, date created)

IWalletValidatorService: determines if a wallet is eligible for transactions, including ownership by the entity claiming it.

IExchangeService: receives and matches orders to convert one form of value into another.

The IPayment service and IIssuer service can layer over any payment system and execute transfers via that provider. Example pseudo code and related data structures for the interfaces can be found immediately below.

```
public interface IIssuerService
{
1.   /// <summary>
2.   /// Issues an amount of new tokens to a designated wallet.
4.   Task<ITransaction> IssueAsync(IWalletIssuerActive wallet,
IAmount amount);
5.   /// <summary>
6.   /// Destroys an amount of new tokens from a designated wallet.
7.   //// </summary>
8.   Task<ITransaction> DestroyAsync(IWalletIssuerActive wallet,
IAmount amount);
9.   /// <summary>
10.  /// Freezes a token.
11.  /// </summary>
12.  Task<ITransaction> FreezeAsync(IWalletIssuerActive wallet,
IToken token);
13.  /// <summary>
14.  /// Retrieves token details.
15.  ///</summary>
16.  Task<ITokenDetail> GetTokenDetails(IWalletActive wallet, IToken
     token);
}
ii.public interface IPaymentService
iii.{
1.   /// <summary>
2.   /// Calculates available routes to deliver amount to designated
wallet.
3.   /// </summary>
Task<List<IPaymentOption>> PrepareAsync(IWalletActive wallet,
IWallet destinationWallet, IAmount amount, IFilter filter = null);
4.   /// <summary>
5.   /// Executes payment using IPaymentOption path using authority of
active wallet
6.   /// </summary>
Task<ITransaction> SubmitAsync(IWalletActive wallet,
IPaymentOption payment);
7.   /// <summary>
8.   /// Cancels ongoing payment transaction using authority of active
wallet
9.   /// </summary>
10.  /// <remarks>
11.  /// Not all providers will support this action
12.  /// </remarks>
13.  Task<ITransaction> CancelAsync(IWalletActive wallet, string uuid);
14.  Event Complete(ITransaction trans);
}
```

Figure 5:
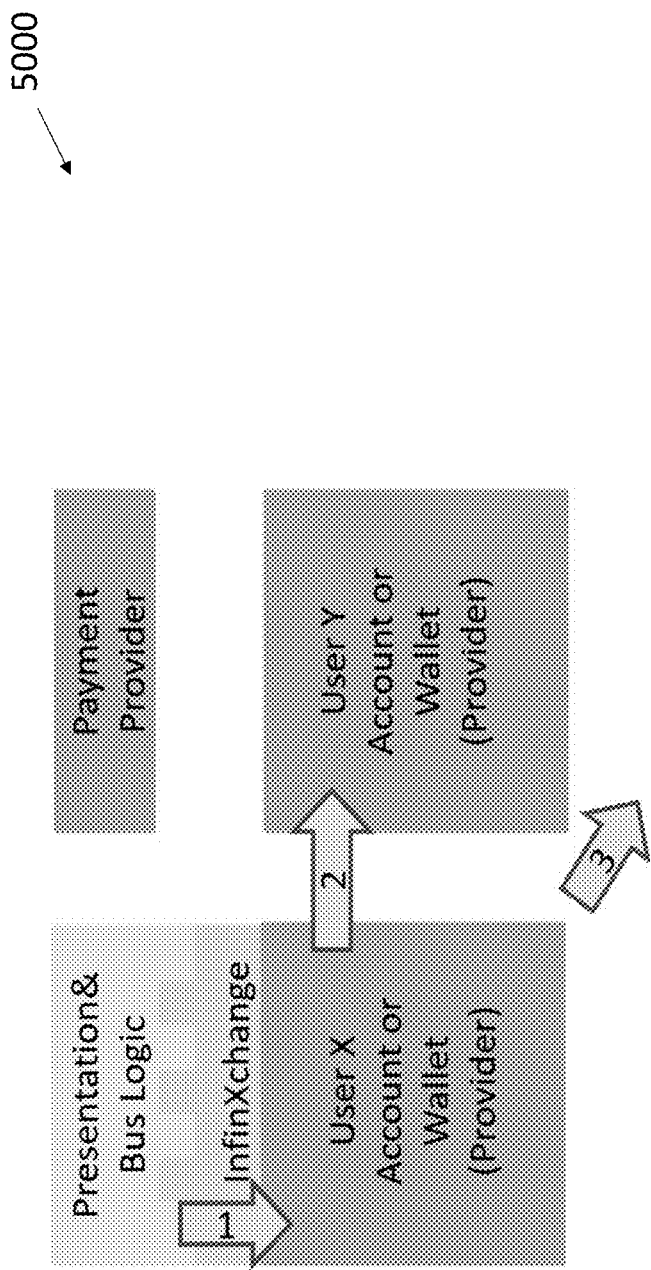
FIG. 5 is a schematic diagram of an example of a simple value transfer in accordance with disclosed implementations.

To understand application of Transaction Service Bus (TSB) module 2002 to complex cross-ledger transfers, it is helpful to first explore how simple payment systems work in the context of the TSB module 2002. FIG. 5 schematically illustrates an example 5000 of a simple transfer. User X (sender) would like to send value to User Y (recipient) on the same ledger (for example, a PayPal transfer). First, the sender will propose a transfer by specifying the function (IPaymentService.Prepare) the recipient (by address) and the currency/amount to be sent (usually denoted in the amount the recipient expects to receive). The system will check the validity of the proposed payment (assess fees/gas, policy, valid recipient, sufficient funds) and will respond with one or more options (in many systems there is only one available option) regarding the amount which must be sent to achieve the desired delivery. If the transfer terms are acceptable for an option, the sender will initiate the transfer (Step 1, PaymentService.Submit) with a signed transaction (login, secret, etc). The system validates the transfer (Step 2, event IPaymentService.Initiated) and moves value by adjusting account balances (reducing source and increasing destination balances) while extracting a transfer fee (Step 3). On completion of the transaction, notification is sent (event IPaymentService.Completed). The new balances are reflected in the source and destination wallets.

Figure 6:
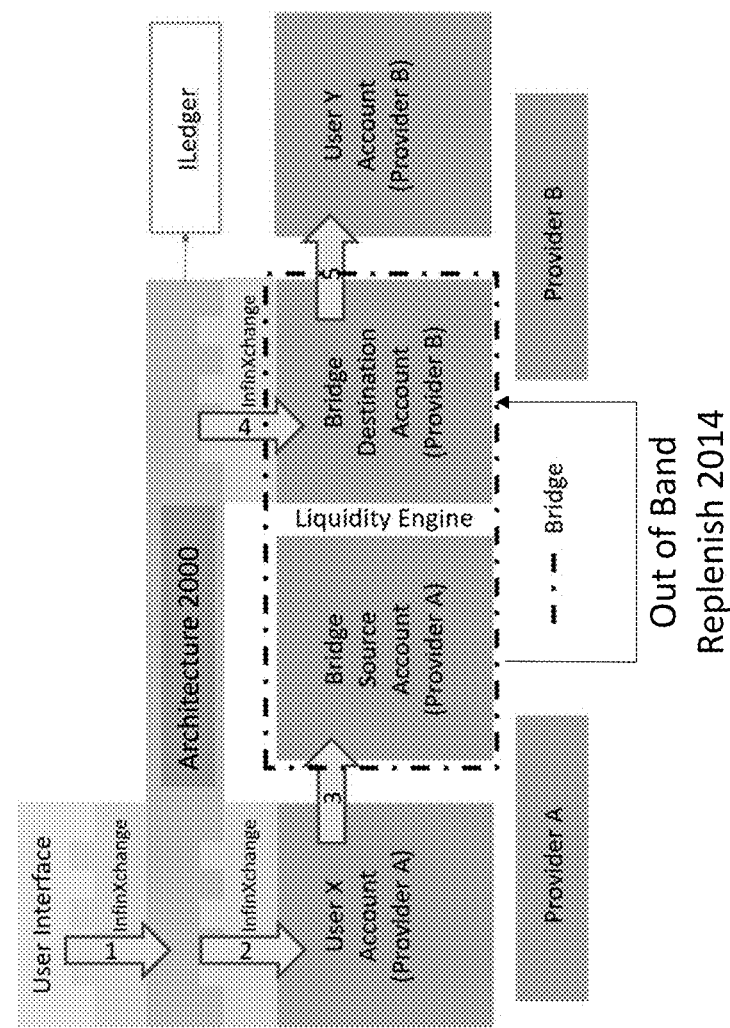
FIG. 6 is a schematic diagram of an example of a chained transaction with an Out of Band replenish path in accordance with disclosed implementations.

A chained transaction in accordance with disclosed implementations may be initiated using these same functions in combination with novel elements of the disclosed implementations. FIG. 6 schematically illustrates an example 6000 of a chained transaction (including multiple sub-transactions to be accomplished in a specified order) in accordance with disclosed implementations. The example in FIG. 6 can use architecture 2000 of FIG. 2 to accomplish the transaction. Individual ledger transfers in the chain use methods consistent with a simple payment with coordinating activities managed by Chained Transfer Handler module 2004 of FIG. 2.

As shown in FIG. 6, the sender proposes a transfer (IPaymentService.Prepare) using the InfinXchange interface. In this example, user X desires to transfer value from and account on Provider A (a first DLT Network for example) user Y's Account on Provider B (a second DLT network for example). At step 1, the Route Planning Service module 2006 FIG. 2 looks for available paths by traversing the node graph (such as node graph 3000 of FIG. 3A) to identify Bridges that can provide a viable path between the source and destination networks, based on the bridge metadata, and obtaining fees for each leg of the transfer. There may be 0 to many paths available for facilitate the transfer. Various techniques (including artificial intelligence may be used to narrow the list of available options or to prioritize the possible paths. The paths can include all necessary InfinXchange interfaces and business logic derived from the bridge metadata.

The sender, or an automated algorithm, can select the desired path and initiate the desired transfer (IPaymentService.Submit). Chained Transfer Handler module 2004 writes the transaction to a ledger of System Transaction Ledger 2013 (FIG. 2) to ensure auditability and recoverability in the result of system failure. This record may be obfuscated using Zero Knowledge Proof techniques to provide immutability without compromising transaction privacy. Chained Transfer Handler module 2004 also publishes an event (IPaymentService.Initiated) to signal the transfer. Chained Transfer Handler module 2004 conveys the user's signing authority to execute a child transfer on the source ledger using the planned route by the IPaymentService.Submit function (Step 2) which includes traversal of dissimilar networks via one or more Bridges. On initiation of the sub transfer, an event is thrown (IPaymentService.Initiated) as this transfer is linked to the parent transaction in the external transaction ledger. On completion of the transfer to the source bridge account (IPaymentService.Completed), an event is thrown to mark the completion of the transfer signaling the handler to initiate the next part of the transaction. A transfer is initiated via the bridge (IBridgeService.Submit). On completion of the bridge transfer (IBridgeService.Completed), Chained Transfer Handler module 2004 initiates the transfer on the outbound ledger using IPaymentService.Submit (Step 4)) to deliver to the value to the destination account or another leg in the chain depending on the route. An event is thrown on the initiation of this transaction (IPaymentService.Initiated). This transaction is linked to the parent transaction in the external transaction ledger of Independent Transaction Ledger module 2012. The value is delivered to the destination account and an event is thrown (IPaymentService.Completed) at Step 5. As the last step in the chained sequence, and event is thrown signaling the completion of all transactions. All sub-transactions are recorded to the ledger of System Transaction ledger 2012.

Alternatively, a chained transfer can be initiated from an external system, skipping Step 1 and Step 2 of FIG. 6, by delivering value to a bridge source account with instructions for delivery to the destination. On receipt, the bridge account issues an IPaymentService.Completed transfer. The Chained Transfer Handler module 2004 reads this event and determines if there is a legitimate payment route. If a route is available, the chain is initiated with the funds held in escrow at the bridge source account. If the transfer succeeds, these funds are released. If the transfer fails, the funds may be returned to the source. If the source ledger supports smart contracts, the initiating transaction can leverage on-chain escrow methods to ensure atomicity of the transaction.

Figure 7:
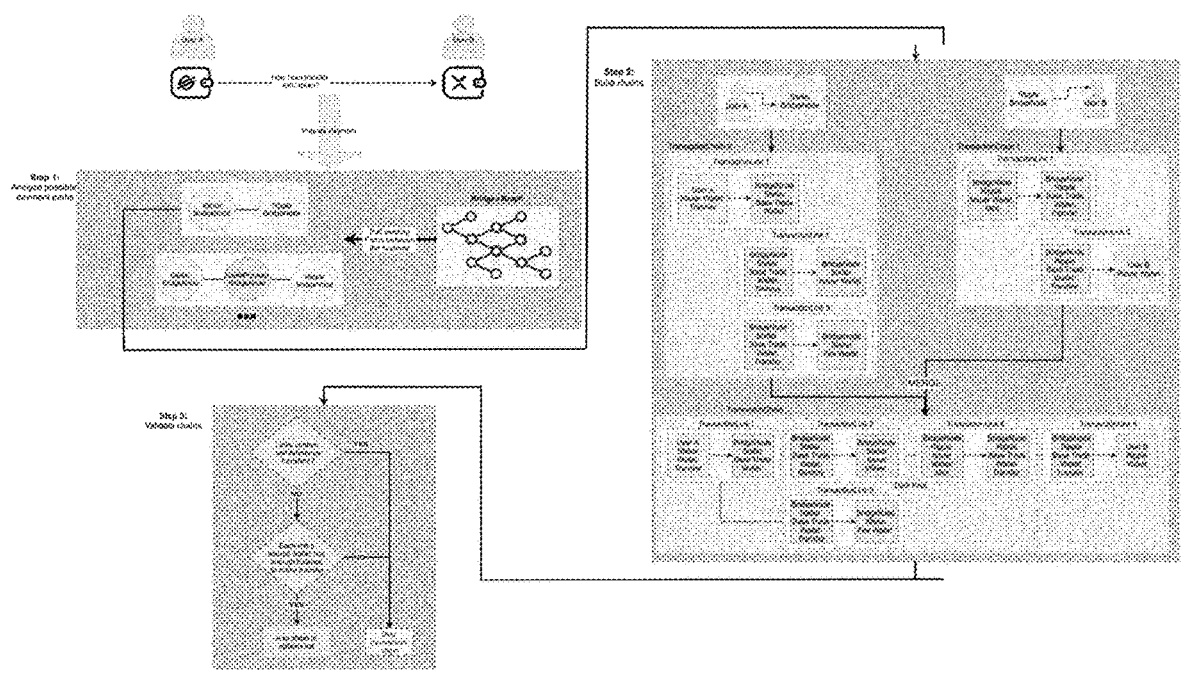
FIG. 7 is a schematic diagram of an example transaction chain building process in accordance with disclosed implementations.

FIG. 7 is a schematic illustration of an example transaction chain building process in accordance with disclosed implementations. The illustrated process can be accomplished by the architecture of FIG. 2. A Route Planning Service module 2006 in combination with InfinXchange™ wrappers, to identify optimal transmission paths across network nodes, given the transaction specified in a transaction data structure. In this example, the specified transaction is "transfer ABC token from User A node on Stellar DLT Systems to User B node on Ripple DLT System". A set of all available options, such as price, and expected delivery time can be specified by the transaction data structure. At Step 1, Route Planning Service module 2006 evaluates all possible routes and available bridges to execute the transfer by traversing the graph of all nodes and Bridges. Possible transaction paths are analyzed by reading bridge metadata for the relevant networks and builds a Bridge Graph that represents all connections between the source ledger (Steller in this example) and destination ledger (Ripple in this example) providers and tokens. The Bridge graph can include all relevant bridge metadata of the Bridges for the identified connections.

Route Planning Service module 2006 can apply a Breadth First Search (BFS) algorithm (a known graph traversal algorithm that traverses a graph layer-wise from a selected node) to find all paths and return a list of BridgeNodeChains, i.e., a list of possible paths for accomplishing the transaction. In this example, two possible paths are identified (TransactionChain 1 and TransactionChain 2). At Step 2, Route Planning Service module 2006 constructs the ultimate transaction path, based on the list and transactional requirements and conditions. For example, where the chain must deliver 1 ABC token to destination wallet and the sum of associated transmission fees equal 0.1 ABC token, the Source must transfer 1.1 ABC tokens. The ultimate transaction path can be constructed to consider various preferences and attributes, such as transaction fees, time for transaction confirmation, and the like.

FIG. 3A can be used to better illustrate the selection of paths and transaction chains. Recall that, in FIG. 3A, Graph 3000 has three DLT networks, each having at least one node. Transactions may occur within a network (e.g., A->B, Y->Z). However, in order to cross between networks, for example transact between nodes that are in different DLT networks, a bridge must be used. Without bridges, no path exists for transfer between, for example, nodes A and Z. To link the networks, bridging accounts B, M, and Y are created. Bridges are then set up to link these accounts. Using Bridge 1, a route between, for example A and Z, exists (A->B~1~Y->Z). A second route exists by linking through a third-party network (A->B~2~M~3~Y->Z). A route planner of Route Planning Service module 2006 traverses the network graph and generates these routes as potential routes. A user (or an automated service) can decide the best transfer path from the identified options based on preferences and other attributes.

Returning to FIG. 7, the ability to move value from one network or ledger to another may involve many potential paths and mechanisms or may have no viable path at all. When a user requests payment delivery, a set of all available options, their price, and expected delivery time must be generated in substantially real time. At Step 2 of FIG. 7, Route Planning Service module 2004 gathers all possible routes by evaluating all available bridges that can provide a path from a source node to a destination node. Transaction Service Bus.

When all abstract paths have been calculated, Route Planning Service module 2006 builds one or more transaction chains based on abstract paths. There are at least two ways to build the chains, start building from Destination (default), or from Source. When starting from Destination to Source, Route Planning Service module 2006 begins with destination conditions as the fixed point. When starting with the source node as the fixed parameter, Route Planning Service module 2006 determines the value the destination node will receive if the transfer begins with 1 ABC. Route Planning Service module 2006 starts building transaction links from source and accumulates all fees and exchanges through the path. For example, if all fees equal 0.1 ABC token, the receiver will get 0.9 ABC token in the end. Route Planning Service module 2006 then builds an abstract path to the real chain based on, for example, the following rules:

| Case | Description | Transaction Chain |
| --- | --- | --- |
| Bridge node -> Bridge node | based on Bridge node configuration, the builder may return either zero link or several. If bridge node currencies are different, and bridge node contains issuer wallet, transaction builder adds 2 links: issue token 1 from issuer to base trade, exchange token, destroy token 2 to issuer. | Link 1: Bridge Issuer wallet → Bridge Base Trade wallet (hidden for user) Link 2: Bridge Base Trade wallet → Bridge Issuer wallet (hidden for user) |

-continued

| Case | Description | Transaction Chain |
|---|---|---|
| Bridge node -> Destination wallet | based on Bridge node configuration, the builder may return either one link or several. The first link is a transfer from Bridge Base trade wallet to destination wallet. If Bridge node contains Issuer wallet, transaction chain builder adds a link issue tokens. This link goes as a Dark Pool and hidden for user If Bridge node contains Fee account, transaction chain builder adds a link with transfer fee from bridge base trade account to the fee account. This link goes as a Dark Pool and hidden for user | Link 1: Bridge Base Trade wallet → Destination wallet Link 2: Bridge Issuer wallet → Bridge Base Trade wallet (hidden for user) Link3: Bridge Base Trade wallet → Bridge Fee wallet (hidden for user) |
| Source wallet -> Bridge node | based on Bridge node configuration, the builder may return either one link or several. The first link is a transfer from user to Bridge Base trade wallet. If Bridge node contains Issuer wallet, transaction chain builder adds a link to the chain to destroy tokens. This link goes as a Dark Pool and hidden for user If Bridge node contains Fee account, transaction chain builder adds a link with transfer fee from base trade account to the fee account. This link goes as a Dark Pool and hidden for user | Link 1: Source wallet → Bridge Base Trade wallet Link2: Bridge Base Trade wallet → Bridge Issuer wallet (hidden for user) Link3: Bridge Base Trade wallet → Bridge Fee wallet (hidden for user) |
| Source wallet -> Destination wallet | this is a case (empty bridge node chain) when the transfer goes within one ledger, so this transfer doesn't require bridges. Adds single link in a chain. | Source wallet → Destination wallet |

Route Planning Service module 2006 then selects all path chains and merges them into the single final transaction chain by removing duplicate links. As shown in FIG. 7, the transaction chain includes TransactionLink 1, TransactionLink 2, TransactionLink 3, TransactionLink 4, and TransactionLink 5. At Step 3 of FIG. 7, a TransactionValidationService validates that the transaction paths can be executed, for example, by checking whether each link source wallet in a path has sufficient balance to submit the transaction and/or checking for self-referencing chains, i.e., where the same node occurs more than once in a chain. (A Policy Engine can verify regulatory compliance at each transfer node. For example, the system and methods described in US Published Patent Application No. US20190164151 A1 can be used to verify regulatory compliance.) Each viable transaction chain may involve fees and exchanges and will have an estimated delivery time. The price of a proposed transfer and the delivery time can be calculated to present to the user prior to user approval of a transfer action.

During a transfer in the chain of sub-transactions, it is possible that a network failure occurs, or the transfer is cancelled (if allowed) prior to completion. In this case a rollback is required. In cases where intermediate fees are charged or exchanges are performed, it may not be possible to reverse the transaction without a loss in value. For these cases, a user may exercise choice to restart the transfer chain to proceed to completion, rollback the transfer, or abandon the transaction by claiming the value in its current state. A successful chain of four sub-transactions (to accomplish a desired transfer transaction) is illustrated at 8002 in FIG. 8. All four sub transactions (8002a, 8002b, 8002c, and 8002d) are successful.

Figure 8:
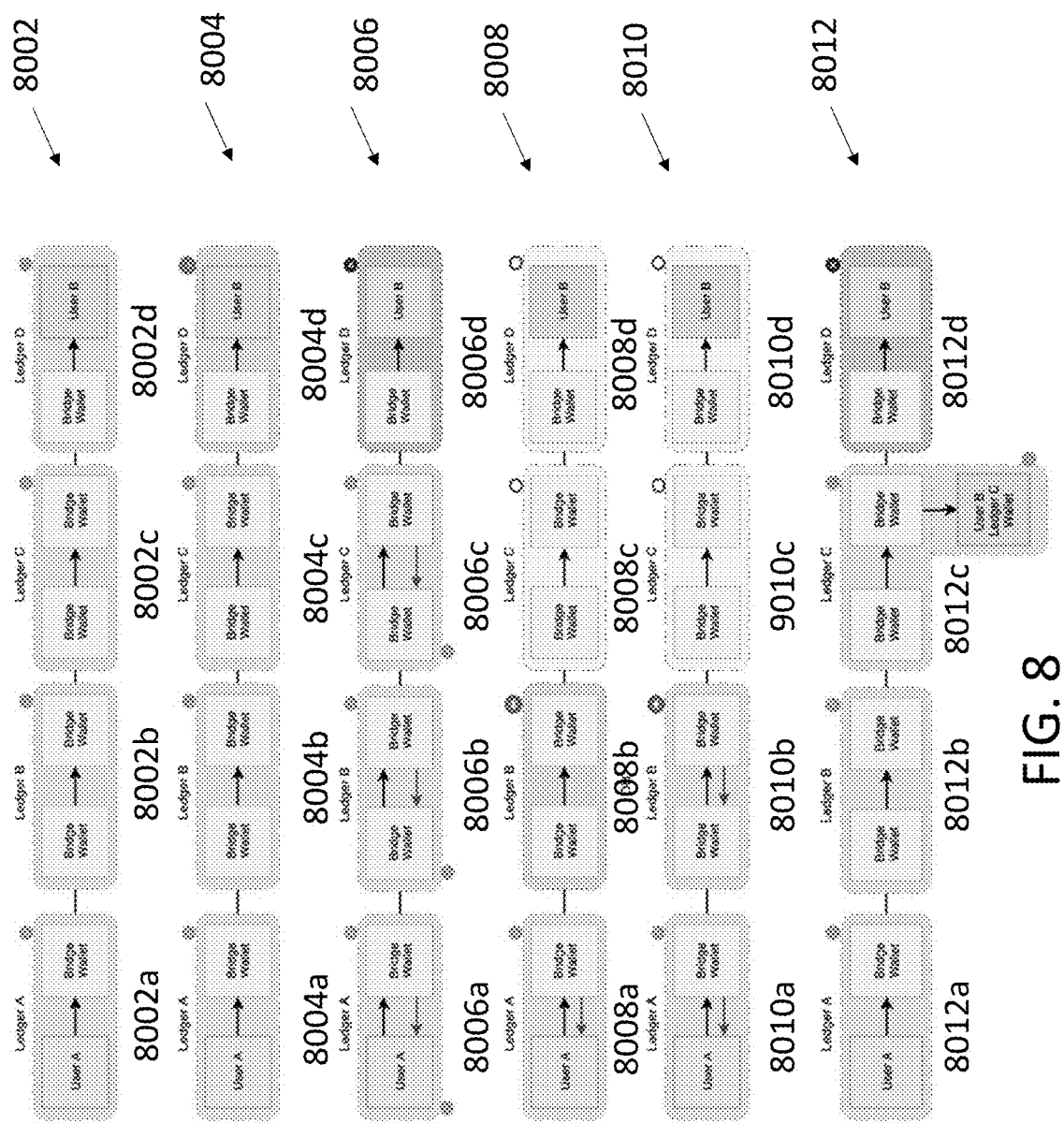
FIG. 8 is a schematic diagram of chained transfers in accordance with disclosed implementations.
Figure 9A:
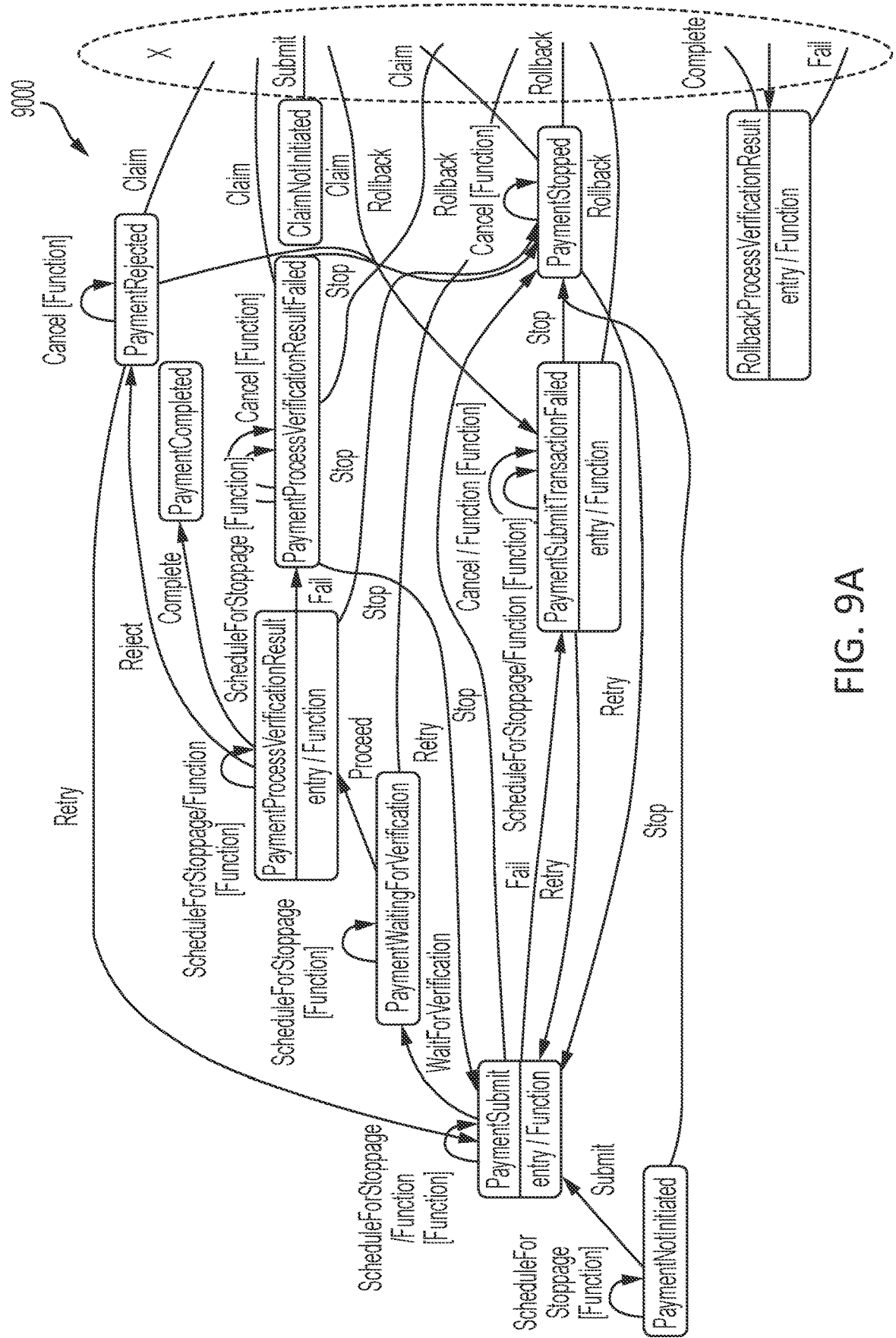
FIGS. 9A and B, in combination, illustrate an example of state diagram for chained transfers in accordance with disclosed implementations.
Figure 9B:
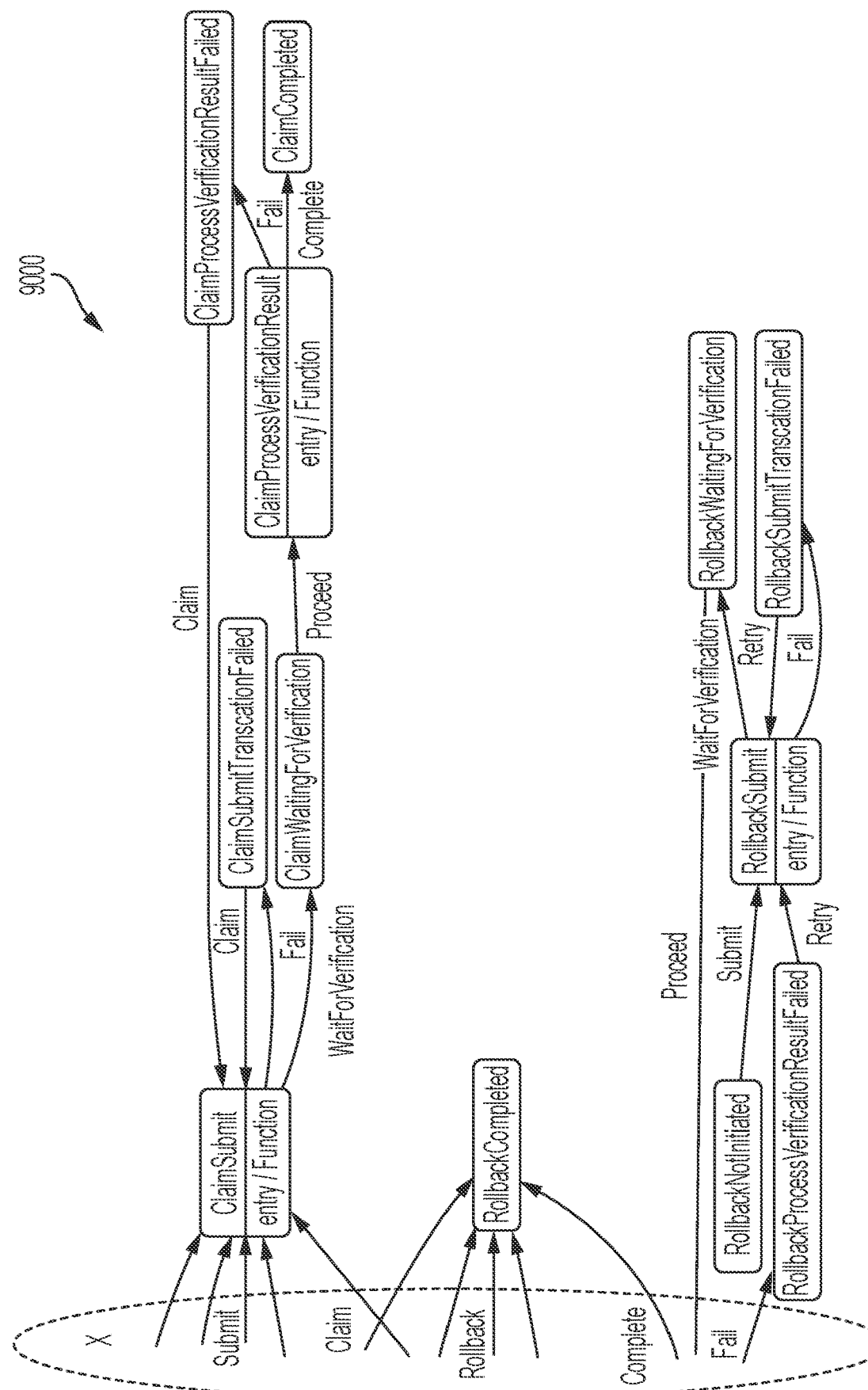

However, depending on the configuration of the bridge, upon a transaction failure, the system may automatically conduct a restart to deliver the value or may halt and await user input. 8004 of FIG. 8 illustrates a chained transaction in which sub transaction 8004d has failed. Depending on the configuration, upon a failure, the chain may automatically initiate a rollback transaction. Rollback transactions are only possible if each bridge used in a route are two-way bridges capable of supporting transactions in both directions. 8006 of FIG. 8 illustrates a rollback transaction. At 8006, sub transaction 8006d has failed and all sub transactions 8006a, 8006b, and 8006c are "reversed" by accomplishing a reverse sub transaction for each of these sub transactions. Further, as shown at 8008 and 8010, transactions may be cancelled en route. In transaction 8008, sub transaction 8008b has been cancelled prior to execution and thus sub transaction 8008a has been reversed. Alternatively, at 8010, sub transaction 8010b has been cancelled after execution and sub transactions 9010a and 8010b are both reversed. Alternatively, if the transaction initiator has the means to receive value via an intermediate ledger, the value may be claimed directly from a halted transaction as shown at 8012. All sub transactions, including reversal transactions, are recorded on system transaction ledger module 2012. FIGS. 9A and B, in combination, illustrate an example of state diagram 9000 for chained transfers.

Each viable route may involve fees and exchanges and will have an estimated delivery time. The price of a proposed transfer must be calculated to present to the user to support a transfer action. Chained Transfer Handler 2004 is designed to provide a manageable alternative to Atomicity (A) and to deliver Consistency (C), Isolation (I), and Durability (D) consistent with ACID (see https://en.wikipedia.org/wiki/ACID_(computer_science) payment delivery). Chained Transfer Handler module 2004 orchestrates cross ledger payments by providing the following functions: ledger interoperability, route planning, price and fee discovery, transaction management, transaction state, and logging. Chained Transfer Handler module 2004 ensures high reliability end-to-end transfer across networks by:

publishing the proposed end-to-end transaction and all sub transactions to a ledger (such as System Transaction Ledger 2012), with zero knowledge proofs, as they execute for traceability and reliability;

sequencing transfers using an interoperability framework that leverages transfer capabilities in each network the transaction traverses; and ensuring each transaction is executed successfully (or rollback) to deliver value successfully.

Isolation (I) is provided via the common IPaymentService plugin which isolates each individual ledger transaction as a component in a larger flow. This plugin framework provides a common model for processing transactions across dissimilar ledgers. Transaction Management: Transaction management provides for the Durability (D) of chained payments. The CTH manages each step of a complex payment sequence to ensure it is executed even in the face of an outage or payment network failure. This component handles parallel or series transactions and executes payment and bridging transactions.

Due to irreversibility of certain transactions (because of fees), long delivery timeframes and frequently changing market conditions that characterize certain chained payments, Atomicity (A) cannot be guaranteed. To provide for slippage (changes in exchange rates or fees from the initiation of a transaction until its completion), the CTH can freeze a transaction in the event of a significant change to allow the user to weigh in regarding the willingness to continue. At this point the transaction may be rolled back (at the expense of fees), the value may be claimed in its existing form, or the transaction may be restarted to proceed to completion (with the user accepting the changed terms).

Since chained transactions may involve more than one ledger, none of the individual ledgers involved will contain end to end traceability of the transaction. To ensure Consistency (C), an overarching ledger is maintained by Independent Transaction Ledger module 2012 to track the overall transaction as well as links to each of the sub-transactions. Chained transfers may occur in series or parallel depending on Bridge configuration. Parallel payments are fastest but may require rollback locks and hedging due to risks in time latency of inbound deliveries. Series deliveries may require significant use of slippage management and require locking of outbound funds to support delays in inbound transactions.

When operating in series, Bridges await verification of the completion (IPayment.Complete event) of the initiating transaction (inbound) prior to initiating the chained transaction (outbound). When operating in parallel, Outbound transactions may initiate immediately after verification of initiation (IPayment.Initiated event) of an Inbound transaction. For parallel operations, the Bridge operator takes delivery risk if the Inbound (and all intermediate) transactions are cancelled or rolled back. Often the Bridge Operator will only allow parallel operations if the inbound network does not allow cancellation or rollback. Alternatively, the Bridge Operator may require collateral or charge a large fee to compensate for delivery risk. For series operations, the initiator may experience slippage risk, that is, a change in price for delivery from the initial terms presented on the initiation of the transaction. For example, downstream networks fees or exchange rates may have changed from the time the transaction is initiated. The Bridge Operator may provide a price guarantee (no slippage) but will often build in a fee to compensate for market changes or hedging strategies.

As is apparent above, in addition to providing a path for transactions across dissimilar network, Bridges can have various logical functions. A deposit is a special example of a bridging function. It involves a Peg linking deposited funds to an equivalent amount of tokens (Hypothecated Assets or IOUs) which are delivered to the user's internal account. IOUs can be transferred to other users or traded for assets via centralized or decentralized exchanges. These tokens can be redeemed (settled) for the value in the counterparty account by using the opposite flow, that is, a withdrawal.

Account balances in the Counterparty pool should exactly match the total number of internal tokens in circulation. Both balances should be published to users. Some networks support token creation and destruction, whereas others require movement in and out circulation via cold wallets.

Figure 10:
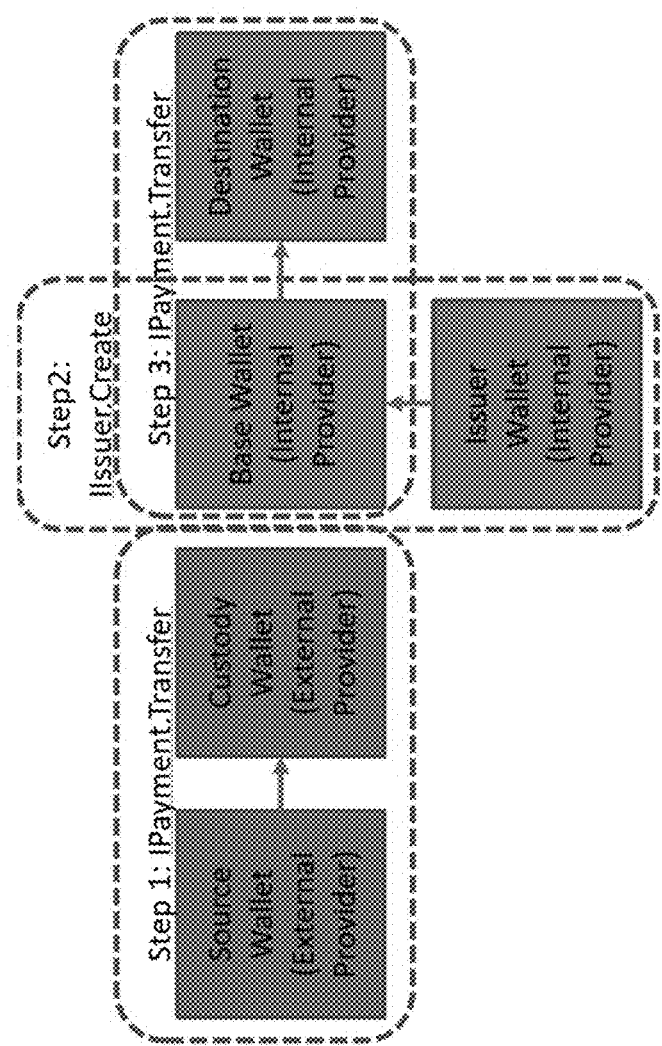
FIG. 10 schematically illustrates an example of the operations for a Bridge accomplishing a hypothecation transfer in accordance with disclosed implementations.

FIG. 10 schematically illustrates an example of the operations for a Bridge accomplishing a hypothecation transfer. At Step 1, value is sent from Source Wallet to Custody Wallet (Bridge Inbound) using an external provider (e.g., OOB, Cascade, PayPal, Ethereum). At Step 2, and equivalent number of IOUs (a digital version of the deposited amount) are issued from Issuer wallet and sent to the Base wallet. At Step 3, Base wallet (Bridge Outbound) enacts IPayment.Transfer send value to Destination Wallet on Internal Provider. This pattern requires the Chained Transfer Handler module 2004 to have the means to detect and attribute transactions on the source ledger and execute transactions from the Issuer Wallet and Base Wallet. Access to this authority can be granted at Bridge setup. Note that it is possible to skip Step 2 and send directly from Issuer Wallet to Destination Wallet.

Figure 11:
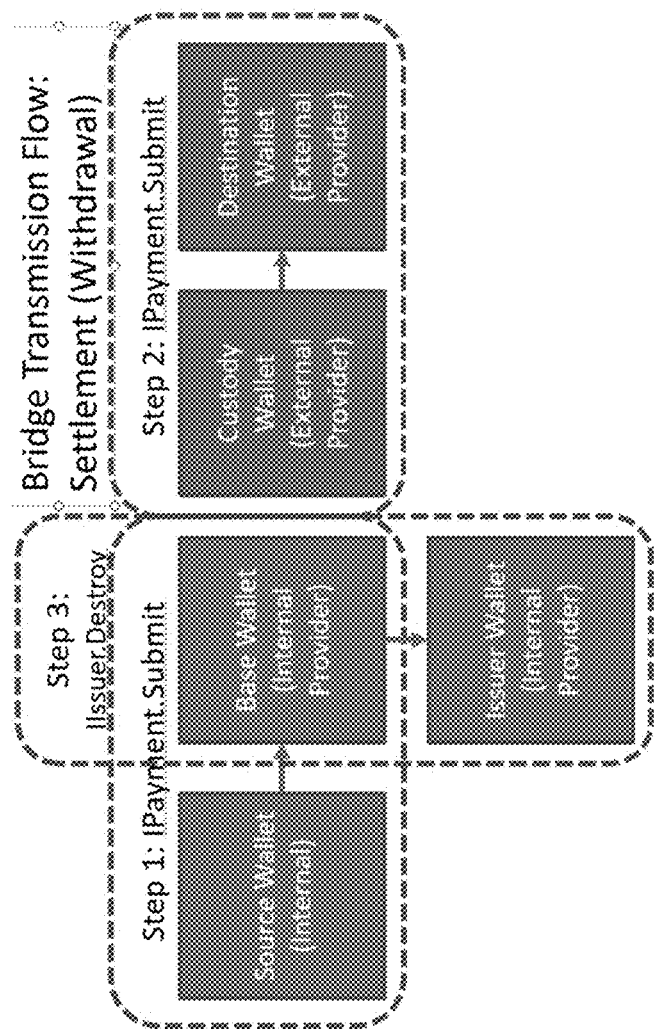
FIG. 11 schematically illustrates an example of the operations for a Bridge accomplishing a settlement transfer in accordance with disclosed implementations.

Settlement is the reverse of a Hypothecation transfer. When the user desires to remove value from a ledger and return the value to its original form, a transfer is initiated that traverses a settlement bridge. FIG. 11 schematically illustrates an example of the operation of operations for a Bridge accomplishing a settlement transfer. At Step 1, value is sent from Source Wallet to Base Account (Bridge Inbound) using External provider (e.g., OOB, Cascade, PayPal. At Step 2, Custody Wallet (Bridge Outbound) enacts IGateway Payment to send value to Destination Wallet. At Step 3, in response to completion of the previous step, an equivalent number of IOUs (digital version of the settlement amount) are burned (i.e., destroyed) from the Base (escrow) Wallet. This pattern requires the Chained Transfer Handler module 2004 to have the means to detect and attribute transactions on the source ledger and execute transactions from the Custody Wallet, and burn tokens from the Base Wallet. Access to this authority can be granted as part of the Bridge setup. Also, it is possible to skip Step 3 and receive directly to the Issuer Wallet from the Source Wallet if the authority exists to reverse the burn if the transaction fails.

Cross Ledger Transmutation can be used for Multi-Ledger issuances. For example, it is used when the official record of ownership is separate from the ledgers being used for transfer, or is the official record is the sum of ownership records on affected ledgers. With an InfinXchange™ summing mechanism that exists above specific ledgers, transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger. This type of Bridge couples a withdrawal and deposit function. By removing tokens from one ledger at the same time tokens are introduced into circulation in another, the total number of tokens remains constant. Funds exiting a ledger are sent to the Source Ledger Base Wallet. This transfer may also be an escrow transaction placing a hold on the tokens without moving them. An equivalent number of tokens are issued into circulation on the Destination Ledger from the Issuer (wallet, account, or smart contract) or Cold Wallet to the Outbound Wallet on Provider B for delivery to the destination. On successful delivery, the IIssuer. Destroy function called on the source ledger removing the tokens from circulation.

Out-Of-Band Transfer module 2104 provides out of band (OOB) processing in cases where value transfer path legs cannot be fully automated within the system. Interfaces are provided to enable third parties to signal and provide data to applicant's system to facilitate processing execution. For example, in the case in which Bridges may only support a one-way flow of funds across networks, a fund imbalance may accumulate and OOB transactions may be required to restore balance. Managing OOB time lags and proper prepositioning of funds in the Outbound account is a logistics problem with firmly established mathematical models for control. Price Discovery is facilitated through the operation of the Price and Liquidity module 2010 (FIG. 2). This module may adjust price through market functions to maintain a balance between Inbound and Outbound account levels. External markets can be used to replenish liquidity. Darkpool owners (those who contribute assets to the pool) receive income from fees linked to pool usage. The Price and Liquidity module 2010 is designed to manage liquidity between ecosystems, currencies, asset exchanges. The Price and Liquidity module 2010 applies market making algorithms to manage liquidity. The Price and Liquidity module 2010 may manage the cost of transfer based on the balance of resources on both sides of Darkpool. It drives up the cost of sustained mismatch in the flow of capital. A sustained imbalance in resource flow between A and B will result in increase in price to move from A->B and decrease B->A. The bigger the mismatch the greater the revenue of the model. Users can "invest" in mismatch to bring liquidity where needed.

Liquidity Darkpools can also be used to facilitate transfers between or within ecosystems when currency exchanges are involved. The chained flow can be repeated across many providers including available currency exchanges to provide a path for any flow of value and use external liquidity. Currency exchange can occur via Price and Liquidity module 2010. Process can be repeated and use counterparty exchange accounts to maximize liquidity.

Figure 12:
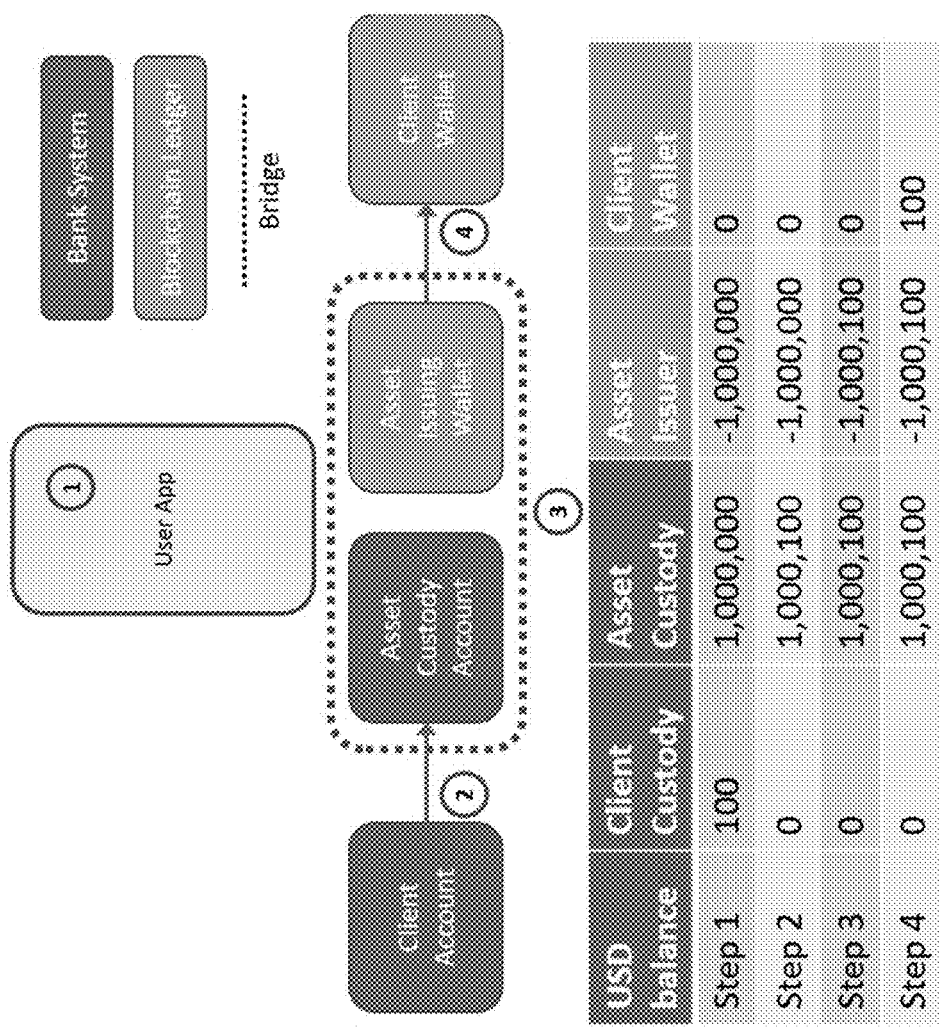
FIG. 12 illustrates balance sheet implications of a deposit (also known as hypothecation) bridging transaction creating the template for an anchoring transaction.

FIG. 12 Illustrates balance sheet implications of a deposit (also known as hypothecation) transaction. In step 1, the client with a USD Custody account containing 100 USD in the banking system initiates a Deposit with a desire to convert value in the banking network to value in tokens on the blockchain ledger. In Step 2, the USD is transferred from Client custody account to Asset custody account. The Asset custody account is the omnibus account holding deposited assets that underpin the value represented on the connected network. In Step 3, upon receipt confirmation, corresponding USD tokens are minted as described above. In Step 4, USD tokens are delivered to the client account wallet.

The deposit transaction, along with its inverse, the withdrawal (settlement) transaction, are depicted as "anchor" transactions as a condensed notation for cross network transactions in FIGS. 15, 16, 17, and 18 with the corresponding conversion to and from networks shown as a gradient between the gray levels of the traversed networks.

Figure 13:
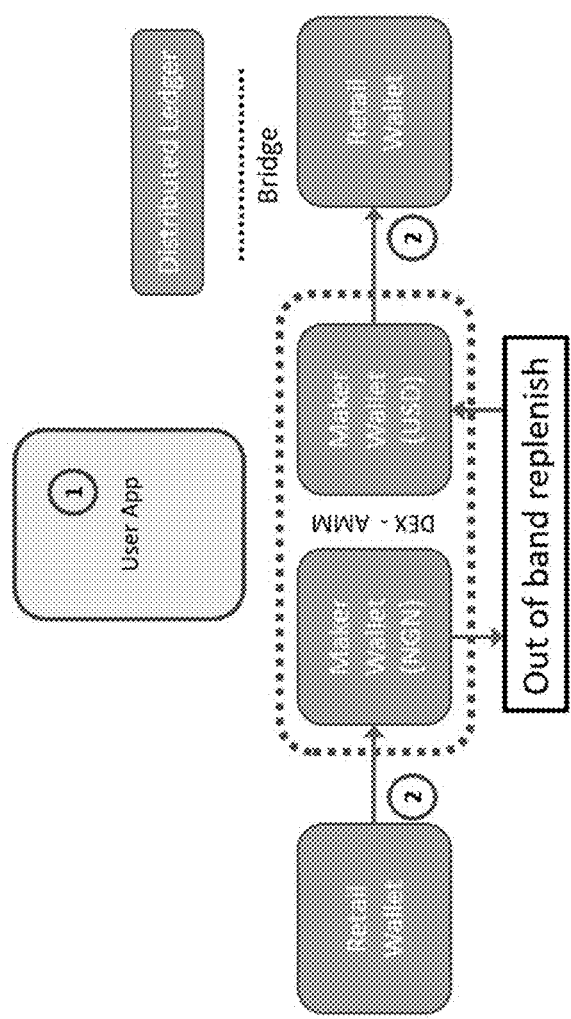
FIG. 13 provides a description of a conversion transaction bridging value networks and including an out of band mechanism to replenish the bridging nodes.
Figure 15:
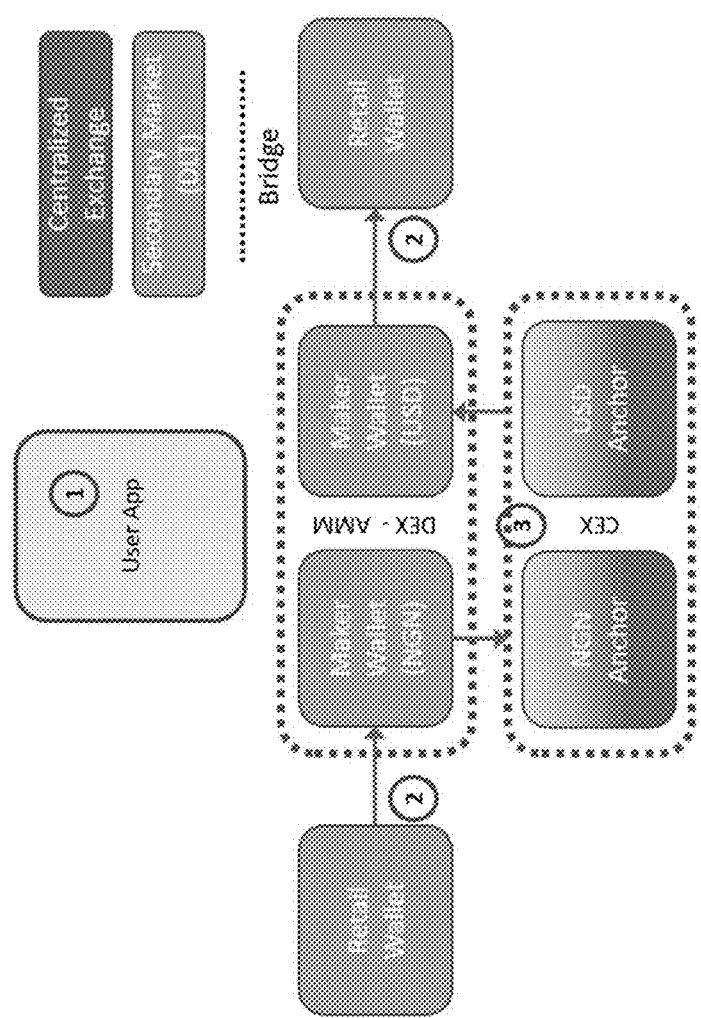
FIG. 15 features a basic implementation of an out-of-band replenish structure involving anchor bridges and an exchange bridge.

FIG. 13 provides a description of a transaction bridging value networks including an out of band mechanism to replenish the bridging nodes to maintain the necessary inventory to operate the bridge. This example, a Liquidity Darkpool as disclosed above is an implementation of a method used to link liquidity in two networks. In FIG. 15, the distributed ledger network is linked to a generic "out of band replenish" network. The linked network may include any implementation that is used to convert the value from the source network to the destination network to replenish the inventory used to support the bridged transaction.

Figure 14:
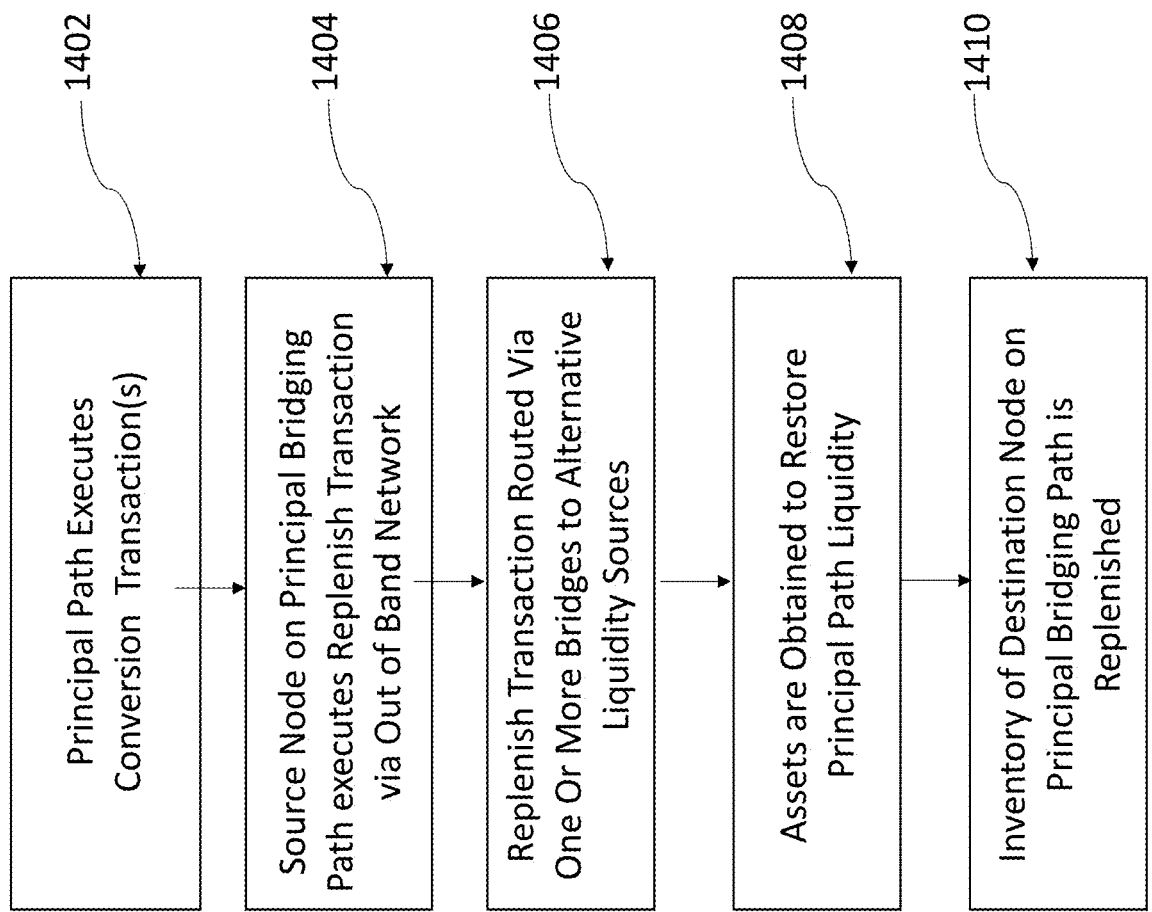
FIG. 14 describes the reference process for a network transaction involving 2 or more linked paths wherein the speed and efficiency of the principal path is enhanced by the alternative path.

FIG. 14 illustrates a reference process for a network transaction involving two or more linked paths wherein one path, the out of band replenish path supports the liquidity (efficient traversal mechanism) of the principal bridging path. As described previously, one or more conversion transactions occur leveraging the bridging nodes on the source and destination networks, the bridging nodes enabling the principal bridging path in step 1402. The source and destination nodes in the principal bridging path are connected are connected via one or more out of band paths, an out of band path being a connection between networks separate from the bridging path, the out of band path consisting of one or more bridging paths independent of the principal bridging path, the out of band path providing the means to increase the throughput, efficiency, and/or speed of the principal bridging path. On accumulation of assets due to a large conversion or an aggregation of many smaller transactions, the source node on the principal bridging path initiates a transaction using the alternative path, to replenish the inventory of the destination node in the principal bridging path in step 1404. To traverse the alternative network to leverage the alternative source of liquidity, the out of band path traverses one or more network bridges in step 1410. The assets from the source bridging node are used to exchange for assets that can be delivered to the destination bridging node in step 1408. The assets are delivered to the destination bridging node in the principal path to restore path liquidity in step 1410.

FIG. 15 illustrates an example of a process of an out-of-band replenish structure involving anchor bridges and an exchange bridge in accordance with disclosed implementations. Cross network transactions are combined with bridging nodes on the source and destination networks that are connected via one or more out of band paths. An "out of band path" is a connection between networks separate from the bridging path. The out of band path can include one or more bridging steps and the inventory needed to sustain the primary bridging network can be sustained using automated methods, such as a smart contract or other programmed business logic effecting a liquidity model. These methods can be configured in the bridge data structure by including the bridge path in the replenish instructions of the bridge configuration.

At 1, a Retail Client desires to convert tokens (NGN tokens as an example) or other assets to USD tokens or another asset) on the distributed ledger network by crossing a Liquidity Darkpool (Exchange Bridge). At 2, the secondary market transaction executes via the bridge as described above. In this step, the NGN tokens are transferred from Client to Maker resulting in an accumulation of NGN. Subsequently (or for blockchain ledgers, simultaneously), USD tokens are transferred from Maker inventory to Client resulting in a depletion of the bridge's USD inventory (see the bridge transaction of FIG. 6)

After accumulation (e.g., aggregation of many NGN conversions), the bridge operator (Maker) executes an out of band replenish transaction (see FIG. 6 for detail) at 3. The replenishment transaction can be initiated manually or automatically based on an inventory threshold or another replenishment/liquidity model. For example, a replenish threshold can be based on falling below a predetermined ratio of source and destination value. This transaction replenishes the USD Token inventory by depositing and converting the value of the accumulated NGN Tokens to USD Tokens on a centralized exchange. As the first step in the replenish transaction, the Maker deposits the NGN Tokens via an Anchor bridge to the centralized exchange (See FIG. 10: Deposit transaction). On conversion via the separate centralized exchange network, the tokens are withdrawn via an Anchor transaction to the Maker USD Token wallet (See FIG. 11: Withdrawal transaction).

To sustain scalable secondary market (peer to peer) operations efficiently and with minimal capital costs, it is beneficial to link and aggregate these transactions with larger scale primary market transactions (business to business). This can be accomplished by automating the "out of band replenish model" described above with one or more bridge transactions to maintain the inventory required to operate the secondary market. For example, if an imbalance occurs in the inventory of the market making pool of the secondary market due to significant demand for the conversion of one asset to another, the asset in excess (often tokenized) can be converted to its underlying asset (often digital [non-tokenized]) using the withdrawal (also known as settlement) bridge using the method disclosed herein. The resulting asset (often digital) may be converted via scalable and deep institutional markets via a primary market (business to business) transaction to the asset that is in deficit using a conversion bridge as disclosed. The resulting asset (often digital) may be converted to the desired bridge pool asset (often tokenized) using the deposit (also known as hypothecation) bridge using the disclosed method. By linking markets (in this case primary and secondary markets) in this way, the liquidity of secondary (peer to peer) markets where users seek convenient near-real time transactions can be maintained even if conversions are imbalanced without the need to maintain substantial and costly bridge inventory.

The disclosed implementations for linking of primary and secondary markets are an example of a concept by which any market or value conversion mechanism can be linked using one or more bridging transactions where the inventory from one bridge is linked to a conversion model consisting of one or more bridge transactions using the disclosed method. The impact of this method is an aggregation of fast, cheap secondary market transactions sustained by larger, often slower, more expensive (on a per transaction basis) primary market transactions.

Figure 16:
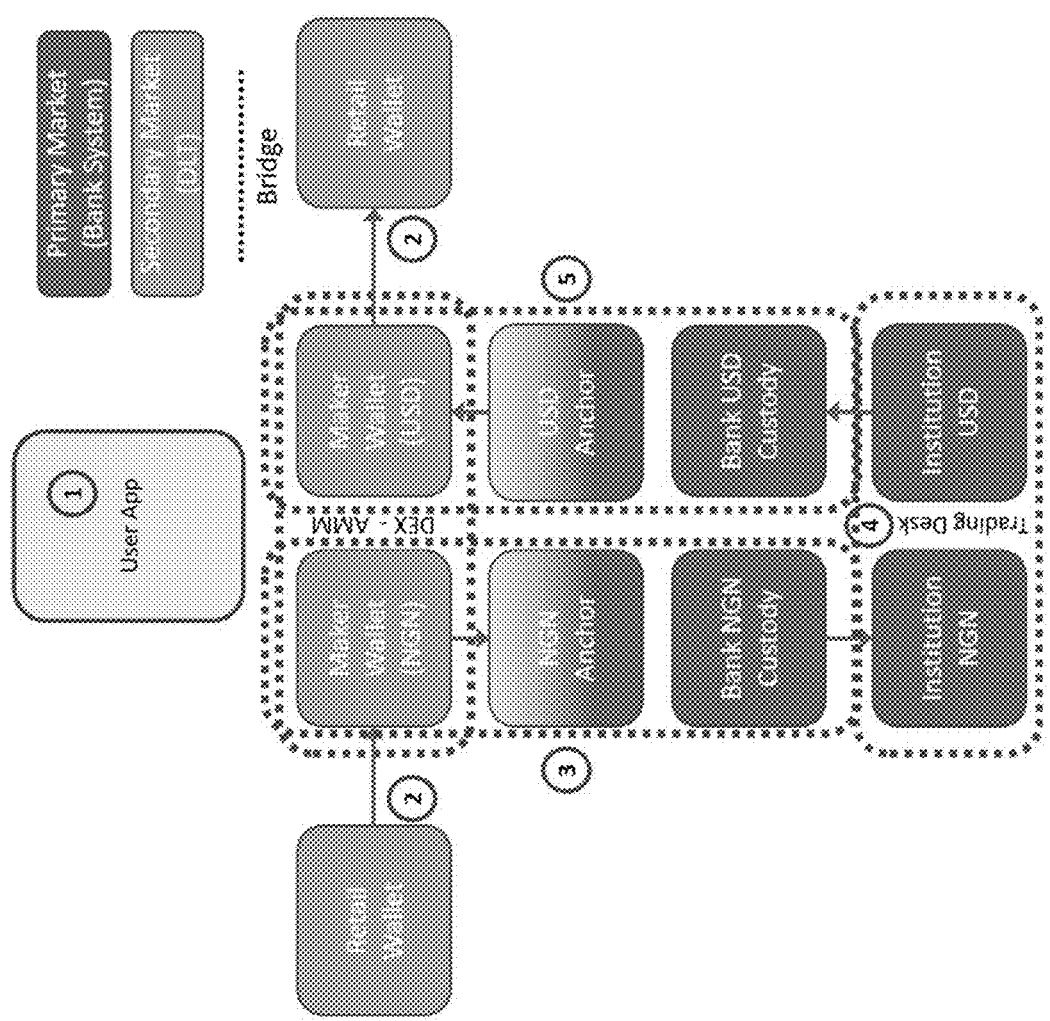
FIG. 16 presents a sequence to link primary (B2B) and secondary (P2P) markets utilizing a chain of bridged transactions.

As an example of linked primary (B2B) and secondary (P2P) markets, FIG. 16 illustrates a sequence for linked markets utilizing a chain of bridged transactions. In At 1, a Retail Client issues a Sell market order using NGN (or another asset) via a secondary market with a desire to convert NGN tokens to USD tokens. At 2, the secondary market transaction executes via the bridge as described above. As shown previously, the NGN interest transferred from Client to Maker results in an accumulation of NGN. Subsequently (for blockchain ledgers, simultaneously), USD is transferred from Maker inventory to Client resulting in a depletion of USD inventory (see FIG. 6: bridge transaction)

After accumulation (aggregation of many NGN conversions in this example), the Maker executes an out of band replenish transaction (see FIG. 6 for detail) at 3. This transaction is to replenish the USD Token inventory by converting the value of the accumulated NGN Tokens. As the first step in the replenish transaction, the Maker redeems NGN Tokens via Anchor bridge to receive bank NGN (see FIG. 11: Withdrawal transaction).

At 4, as part of the automated linked sequence, a trade is executed in the bank Primary Market trading the NGN via institutional market to obtain USD. At 5, the resulting USD is deposited via an Anchor (See FIG. 10: deposit transaction) to produce USD tokens which are transferred to Maker wallet restoring the liquidity of the secondary pool.

The sequence of the above transaction minimizes delivery risk in the out of band replenish sequence by ensuring the previous step is completed before initiating the subsequent step. Based on the assurance of delivery or a tolerance of market slippage (changing of price between when an action is requested and completed), the order of transactions 3 through 5 may be varied to provide a responsive sequence. For example, the minting and deposit step at 4 may be executed prior to trade execution, if prices are locked in at the trading desk for the trade transaction. By removing the requirement for steps to execute in a sequential order, the delivery path can be said to be delivered asynchronously.

If the proposed secondary market transaction exceeds the available liquidity of the bridge (that is, the desired conversion of NGN to USD exceeds the available inventory of USD in the bridge pool in this example), the order may be routed using the TSB module 2002, if desired as a path identified via the Route Planning Service module 2006, directly through the primary market path instead of traversing the secondary market bridge (see FIG. 2).

Figure 17:
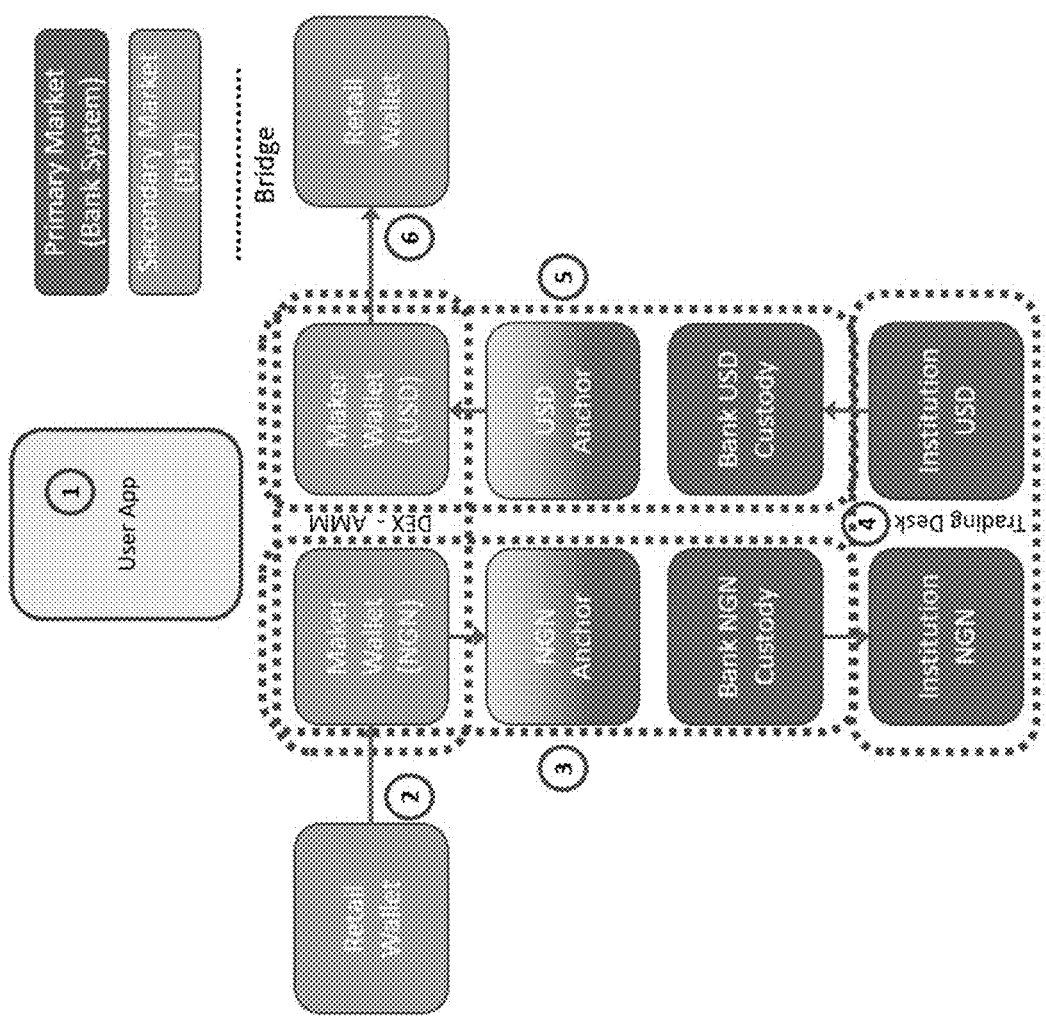
FIG. 17 presents a sequence to bypass secondary markets with insufficient liquidity by routing the conversion transaction directly to primary (B2B) utilizing a chain of bridged transactions.

To illustrate direct routing via linked primary (B2B) markets, FIG. 17 illustrates a sequence for linked market utilizing a chain of bridged transactions. At 1, an Institutional Client issues a large Sell market order using NGN (or other asset) with a desire to convert NGN tokens to USD tokens. At 2, the assets are sent to the bridge wallet as described in the earlier disclosure but, rather than executing a secondary transaction as described previously, these assets are immediately processed for subsequent (for blockchain ledgers, simultaneous) transactions at 3. The NGN Tokens are redeemed via Anchor bridge to receive bank NGN (see FIG. 11: Withdrawal transaction). At 4, as part of the automated linked sequence, a trade is executed in the bank Primary Market trading the NGN via institutional market to obtain USD. At 5, the resulting USD is deposited via an Anchor (See FIG. 10: deposit transaction) to produce USD tokens which are transferred to the destination at 6.

By adjusting the order of the transactions of 3, 4, and 5 in an asynchronous path execution as described above, fulfilling the primary market order after the execution of the transaction at 6, it is possible to execute the transaction at 2 and 6 simultaneously (or in rapid succession) providing the same near real time responsiveness of the secondary market bridge path.

Typically, primary market path execution is expensive or is limited only to very large orders. Therefore, linking a secondary market with an asynchronous execution path for the primary market provides near real time delivery for orders of any size (large or small) with the efficiency of the secondary market and the volume of the primary market resulting in a convenient scalable order execution model for all market participants.

To permit the convenient, fast, risk free delivery of assets via a Liquidity Darkpool, the bridge operator must have an inventory of assets available to meet the liquidity demands of the secondary market. But the requirement to maintain an inventory of assets exposes the operator to the volatility of the assets in the liquidity pair. For example, to support the liquidity needs of an NGN-ETH pair, the bridge operator needed to have a large supply of NGN and ETH assets on hand. If the price of either asset dips significantly, the value of the required inventory owned by the bridge is reduced leaving the bridge operator exposed. Bridge operation losses due to asset volatility are known as divergence or impermanent losses.

To avoid exposure to impermanent losses, the bridge operator may desire to implement bridge operations by including a lending model permitting the bridge to be operated in a long (balance sheet asset) or short (balance sheet liability) position for either asset. Therefore, introducing a lending model into the sequence as shown in FIG. 18 permits the operator to operate in a risk neutral position.

Figure 18:
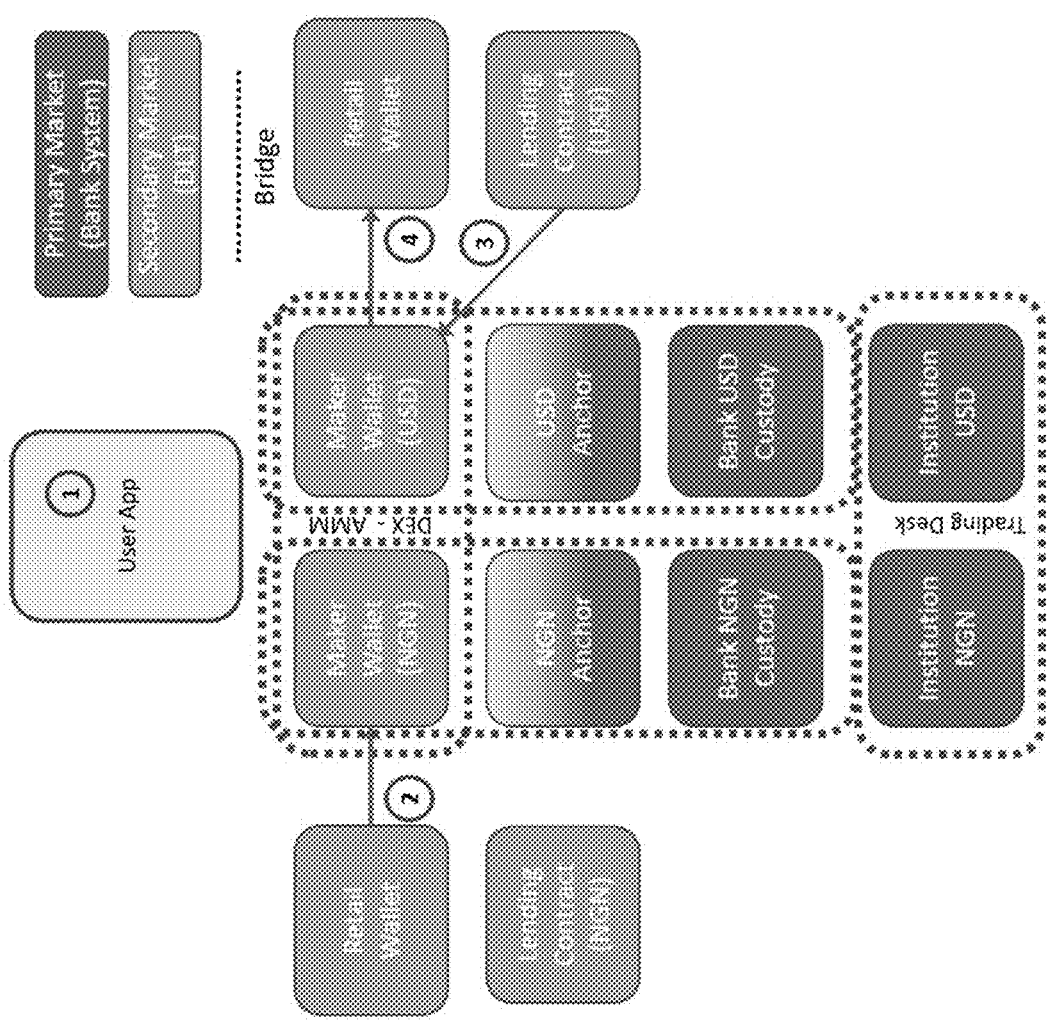
FIG. 18 presents a sequence for linked markets utilizing one or more lending pools.

To illustrate linked primary (B2B) and secondary (P2P) markets, FIG. 18 shows a sequence for linked markets utilizing one or more lending pools. At 1, a Retail Client issues Sell market order using NGN (or other asset) via secondary market with a desire to convert NGN tokens to USD tokens. At 2, the secondary market transaction executes via the bridge as described in the earlier disclosure. As shown previously, the NGN interest transferred from Client to Maker resulting in an accumulation of NGN. As before, the bridge operator may choose to convert this surplus via an out of band replenishment transaction.

At 3, assets required for the destination inventory are drawn from a lending pool for delivery. At 4, these assets are delivered to the destination. On blockchain ledgers using flash lending protocols, transactions 2 through 4 can occur simultaneously during a single block in an atomic transaction. In other implementations, the sequence of 3 and 4 can be varied or can occur in batch or asynchronously.

Often, a fee or interest may be charged for the loaned assets. Therefore, it is desirable to minimize the number of lending transactions and/or the length of time the total balance for an asset is negative. Alternatively, in a separate or combined implementation to counteract impermanent loss, the bridge operator may purchase put options for each asset in the pool to counteract the downside price risk for the asset. A put option ("put") is a contract that gives the owner the option, but not the requirement, to sell a specific underlying security at a predetermined price within a certain time period. The value of a put increases as the underlying asset price decreases, and conversely, the value of a put decreases when the underlying value of the asset increases. Therefore, a put option is a hedge against price movements of assets in bridge inventory and can be used by the bridge operator to counteract impermanent loss. In general, the purchase of put options incurs a fee. If used, put options can counter impermanent loss but incur a fee that should be recouped via bridge fee management.

Convenient, real-time delivery of assets via a bridge depends on a ready supply of available assets in the bridge inventory. Proper inventory management becomes the dominant factor in successful bridge operations. The choice to use long or short inventory positions or put options for an asset are based on optimizations described in further detail below.

In general, consumers of bridge services are willing to pay a fee for the convenience, speed, and/or efficiency of asset delivery. Bridge management costs, the cost of operations, and the cost of inventory can be counteracted through the application of a bridge traversal fee. This fee may enable bridge operators to make a profit through bridge operation that, in principle, is proportional to the demand for bridge liquidity. Greater demand for bridge operations, provides a greater opportunity for revenue, and a larger demand for inventory, that is access to available assets for delivery.

To maximize profit, the bridge operator will seek to minimize costs. Typically, the dominant cost incurred is the cost of inventory to operate a bridge. Maintaining the necessary inventory to operate the bridge requires the operator to purchase (or borrow) the required assets. This comes at an opportunity cost (interest rate) for the capital used to purchase the inventory. Therefore, inventory optimization is an essential component to bridge management. Given the stochastic nature of bridge usage, bridge inventory optimization borrows from supply chain management practices used in other disciplines such as warehouse inventory management.

Described previously are methods for addressing structural liquidity issues with modern Peer to Peer (P2P) (AMM) conversions by optimistically seeking liquidity in capital efficient ways see FIG. 13, FIG. 16, and FIG. 17. Within the confines of this described structured is a generalized model and framework that effectuates this system.

The proposed generalized model is rationalized with established inventory systems management techniques adopted in both financial and non-financial industries. These include but are not limited to the various approaches in system dynamics of inventory management and financial engineering disciplines concerning interest rate and collateral needs & allocation modelling. The models are stochastic in nature where discrete movement of value are made in a given time series however the rate of these movements have a heuristic element and must account for a variable of "noise" in the system.

The management of value inventory needed to enable efficient conversion of value from one form to another can be described as financial logistics. On one hand, sufficient inventory must be maintained to ensure proper liquidity in the system. During periods of high one-way demand for value conversion, a bridge node may run out of inventory preventing value conversion. On the other hand, maintaining inventory has an opportunity cost. Additionally, bridge operations incur expenses (the cost of out of band replenishment transactions, gas fees on blockchain networks, hedging fees, and other operating costs must be accounted for. If bridge operations do not produce sufficient return for the bridge owner, capital is better applied elsewhere. To generate revenue, the bridge operator charges a fee for value conversions. The fee is born by consumers of bridging services willing to pay for the convenience, speed, and/or efficiency of delivery. Fees may be charged as a flat fee, a percentage of the transaction value, or a spread, that is the difference between the price of conversion in one direction (USD->BTC) versus the opposite conversion (BTC->USD) or the difference between the price of conversion via the bridge and the price of the conversion via an out of band replenishment channel.

Demand for liquidity (the fee consumers are willing to pay for value conversion) is one factor in determining the potential return on investment in bridge inventory. Liquidity demand will depend of the efficiency and accessibility of other sources of liquidity to parties seeking to convert value. If value conversion outside of bridge operations if difficult, expensive, or inaccessible to many users, the fees commanded by the bridge can be higher.

Liquidity supply (the cost of operating the bridge and maintaining its inventory) is the other factor. Bridge operating costs include: the cost of maintaining inventory (if lending is used to populate the inventory, the cost to borrow the assets and for long positions the opportunity cost of the capital in the form of the expected ROI for deposits); the extent of the mismatch in flows in either direction in the bridge and the variability in the demand in either direction; the cost and time to replenish inventory via the out of band path; the volatility of the price of the asset in inventory and the volatility of the price of conversion (impermanent loss); the cost of hedging if used and other operating costs.

Figure 19:
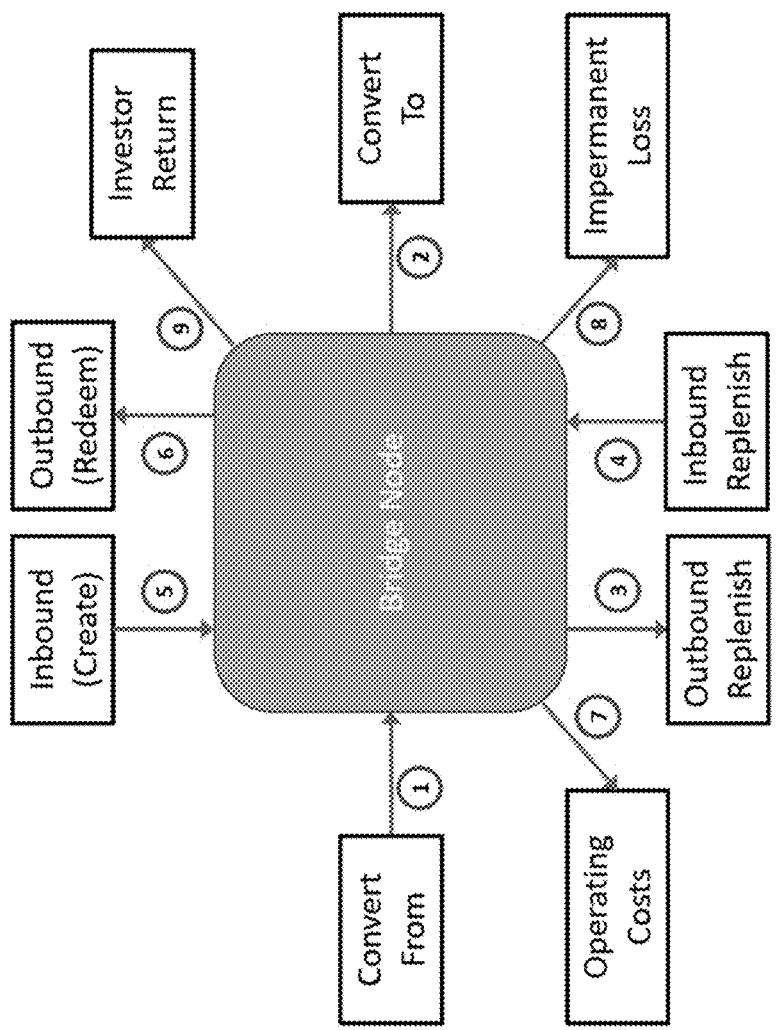
FIG. 19 illustrates the value flows associated with a single node in conversion bridge operations.

FIG. 19 presents a view of the value flows associated with a single node in conversion bridge operations. In a node, conversions from the source form result in an accumulation of value in the node and conversions to the form as a destination result in a reduction in the total value of the inventory. Outbound out of band replenish operations will decrease inventory while inbound replenish operations increase inventory. Investors seeking return may invest in bridge operations resulting in an influx of value via a creation transaction. Investors withdrawing assets from the bridge remove value from the bridge inventory via a redemption. Bridge operations and management will incur fees which remove value from the ecosystem. Similarly, impermanent loss resulting from the volatility of the asset pair removes value from the system. Investors expect a return on their investment in inventory resulting an outflow of value from bridge node inventory. Each flow can be modeled to develop the required fees to sustain operations and maintain equilibrium in the system.

Inventory management models are centered around minimizing the required inventory and its applied dynamics costs to meet stochastic demand requirements while maximizing available fees to increase inventory return on investment, that is, to maximize the difference between the return on asset inventory and the cost to borrow the asset.

Defined for each asset in the pool will be idealized normalized ratio amongst the assets that describes the ideal allocation of the assets within the pool based on a myriad of factors. Here the inventory and fee framework works in tandem as closed loop control system to anticipate movements of the assets in the pool, primarily through the rates of change in withdrawals and deposits, and the availability from counterparties in deep institutional or cross computer networks. This allows the model to anticipate if the normalized quantity of an asset will deviate from its idealized normalized value quantifying both its rate of deviation, acceleration of deviation, and magnitude of deviation. If the deviation results in excess of an asset the model can monetize this excess by adjusting its fee structure or lending the asset to deeper counterparties. Similarly, if the deviation results in a shortage of liquidity, the model can anticipate this and request ahead of time the appropriate amount, that is to say the quickest available at the cheapest borrow rate form a variety of counterparties in order to rebalance the pool. Should an order exceed the set normalized boundaries of liquidity, the model can optimize the fee structure to charge a higher premium and tranche the order (using bulk, iceberg, and other types of segregated large bulk order techniques) as to not compromise its own liquidity levels outright. This ability to orchestrate transactions of significant liquidity size is a novel innovation not yet seen industry and a central patent claim.

Figure 20:
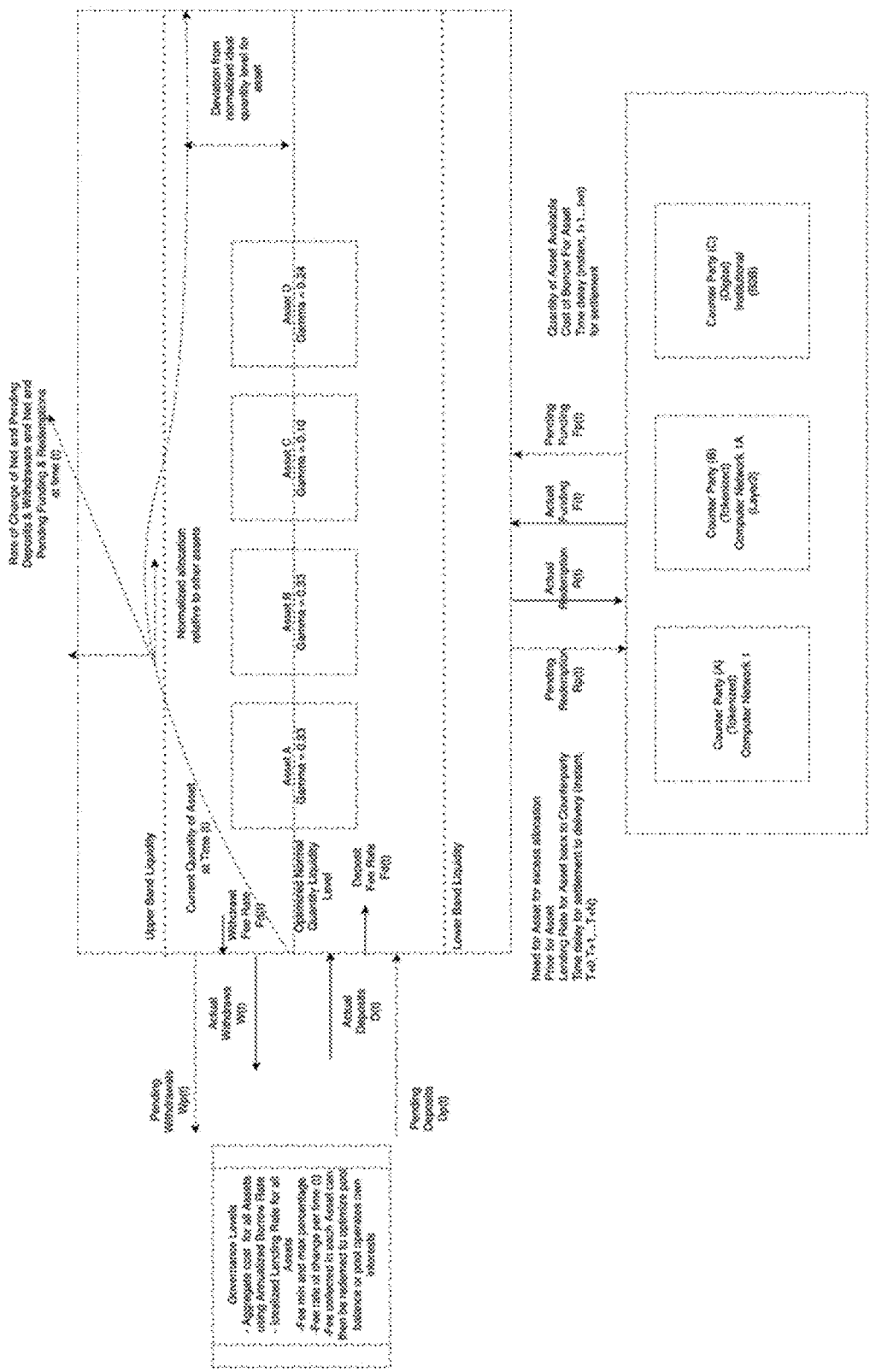
FIG. 20 illustrates a generalized representation utilized to describe the mechanism used to optimize economic incentive and manage inventory for asset pairing across a multitude of intermediaries.

FIG. 20 depicts a generalized representation utilized to describe the mechanism used to optimize economic incentive and manage inventory for simplistic single asset pairing or multiple asset pairing across a multitude of intermediaries to an eventual anchor source.

| Model Variables | | |
| --- | --- | --- |
| Description | Symbol | Invariance |
| Quantity of Asset A | $Q_A$ | N |
| Quantity of Asset B | $Q_B$ | N |
| Min Quantity of Asset | $Q_{Amin}$, $Q_{Bmin}$ | Y |
| Max or Ideal Quantity of Asset | $Q_{Amax}$, $Q_{Bmax}$ | Y |
| Price of Asset A at a given time (t) in terms of Asset B | $P_{AB}(t)$ | N |
| Annualized Variable Borrow Rate at a given time (t) of an Asset | $R_A(t)$, $R_B(t)$ | N |
| Annualized Variable Lending Rate at a given time (t) of an Asset | $L_A(t)$, $L_B(t)$ | N |
| Annualized Cost of Carry for a given asset at given time (t) (does it cost more to lend or to borrow at current rates) | $C_A(t) = (Q_A * P_A)[(1 + R_A(t))^t - (1 + L_A(t))^t]$ | N |
| Annualized Variable Inflation Rate of Asset at a given time (t) | $Ir(t)_A$, $Ir(t)_B$ | N |
| Current Ratio or balance of Assets in pool at a given time (t) | $Cr_{AB}(t) = |Q_A/Q_B|$ | N |
| Rate of Withdrawal of a given Asset in pool at a given time (t) (Demand Rate) | $\Delta W_A(t)$, $\Delta W_B(t)$ | N |
| Pending Withdrawal of given Asset in a given time (t) | $W_A^p(t)$, $W_B^p(t)$ | N |
| Rate of Deposit of a given Asset in a pool at given time (t) (Supply Rate) | $\Delta D_A(t)$, $\Delta D_B(t)$ | N |
| Pending Deposits of a given Asset in a pool at given time (t) | $D_A^p(t)$, $D_B^p(t)$ | N |
| Net Rate Movement of a given Asset in pool at a given time (t) | $\Delta M_A(t) = |\Delta W_A(t) - \Delta D_A(t)|$ | N |
| Normalized Quantity value tolerance at time (t) for a given asset | $\pm \gamma_A$, $\pm \gamma_B$ | Y |
| Target Quantity value for a given asset (normalized from 0 . . . 1) | $\lambda_A$, $\lambda_B$, | Y |
| Fee paid per transaction in given Asset currency or pricing terms | $|\alpha|$ | N |
| Amortized Annualized Cost of Deployment and Operations of pool for given time T | $|\beta(t)|$ | N |

Fees are primarily a function of the demand rate, supply rate, amortized cost of operations, the combined borrow rate, inflation rate, and asset quantity of the transaction itself from the pool.

$$\theta^A_{Fee}(t) = (\Delta W_A(t) - \Delta D_A(t) + Ir(t)_A + |\beta(t)|) * Q_A$$

Similarly, the inventory optimization is always $\pm \gamma$ the normalized target pool quantity $\lambda$ as the pool will determine if it has excess or deficit of a given Asset considering the current quantity values, the rate of withdrawals, rate of deposits, the pending withdrawals, pending deposits and other factors.

Leveraging different inventory management methodologies will determine how the pool will engage the institutional liquidity providers in digitized form or across heterogenous computer networks. This includes how much to request of a given pool asset, when to make the request in anticipation of tolerance violation, and if it the request can be dynamically scale based on the magnitude of the tolerance violation.

Further research is being done to model this phenomenon to ultimately reduce the amount requested at the latest possible point as to avoid overly greedy and ultimately costly refilling of pools. Other factors such as a waterfall method for requesting from multiple institutional providers, price volatility, demand volatility, and even catastrophic demand destruction will also be considered as shown:

$$\lambda_A = 1/Q_A(t) \pm \gamma_A + \Delta M_A(t) + \Delta Vol(P_A)(t) + \{ \ldots \}$$

Additional alternative structural and functional designs may be implemented for conducting cross ledger transfers, linking markets using bridges, and/or managing inventories and fees of the associated markets. Additional network implementations such as blockchain Layer Two Computer Network performance optimizations are also considered. These methodologies include side-chains, roll-ups and batching, channels, and zk-snark proof optimizations. Critically this expands the definition of Heterogenous Computing Network to include any interlinked optimization layer or Layer 2 technology that may be used to host a bridge node for Cross Network transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for interfacing heterogenous computing networks to accomplish a cross-network transaction in a system consisting of multiple networks, the method comprising:
receiving information proposing a transaction that spans at least two networks and has a source node and a destination node;
traversing a graph structure, the graph structure including transaction nodes within transfer networks and bridges that span networks and being created by a multi-agent system that crawls the networks to identify a path between the source node and the destination node using nodes and bridges, wherein, each nodes in the graph structure exists on a network and each have an associated set of attribute variables, the attribute variables specifying supported tokens, and a bridge path defined by two nodes spanning two logical networks, the bridge path having attribute variables representing transmission characteristics wherein the source node and the destination node are also connected via one or more out of band network paths which are separate from the bridge path, the one or more out of band paths consisting of one or more network paths that are independent of the bridging path;
generating transaction routing information specifying a set of sub-transactions for executing the transaction based on the graph structure, the information including the anticipated cost and time of the transaction if the route is used; and
controlling execution of the set of sub-transactions using a manager that executes and controls the sequencing of execution of the sub-transactions across heterogeneous networks, ensures and records successful execution of the full chain, and executes rollback if the transaction fails.

2. The method of claim 1, wherein at least one of the one or more out of band paths are defined by traversing a graph structure, the graph structure including transaction nodes within transfer networks and bridges that span networks and being created by a multi-agent system that crawls the networks to identify a path between the source node and the destination node using nodes and bridges, wherein, each node in the graph structure exists on a network and each have an associated set of attribute variables, the attribute variables specifying supported tokens, and a bridge path defined by two nodes spanning two logical networks, the bridge path having attribute variables representing transmission characteristics.

3. The method of claim 2, wherein the generating includes determining transfer paths based on the transaction routing information, the transfer paths including the set of sub-transactions, the determining including inspecting a catalog of transfer messaging terms and a translation schema to convert heterogeneous ontologies of DLT networks in the optimized transfer path to a syntax-independent model and modeling the sub-transactions according to the syntax-independent model and applying interfaces between the DLT networks in the optimized transfer paths.

4. The method of claim 1, wherein pairs of nodes in the graph structure and the corresponding sets of attribute variables define a bridge data structure providing linkage between the nodes in the pairs of nodes.

5. The method of claim 4, wherein at least some of the pairs of nodes correspond to accounts in different networks.

6. The method of claim 4, wherein the bridge data structure specifies, at least one source network wallet, at least one destination network wallet, and transaction pricing models for value flowing between nodes in the pair of nodes.

7. The method of claim 4, wherein the bridge data structure specifies transformation logic to be attached to the logical interfaces.

8. The method of claim 1, wherein the generating comprises traversing the graph structure in accordance with a node traversing algorithm and parsing the attribute variables to identify acceptable routes.

9. The method of claim 1, wherein each node is wrapped with a common transaction interface that translates syntax independent instructions to the specific network syntax to enable transaction execution on dissimilar networks.

10. The method of claim 1, further comprising publishing the transaction and the linkage to each sub-transaction to an independent ledger.

11. The method of claim 10, wherein the published transaction uses a Zero Knowledge Proof to provide immutability while maintaining transaction privacy.

12. The method of claim 1, wherein the bridge path is used for a conversion transaction in which a transfer that results in the changing of one form of value to another, wherein the bridge data structure contains a source node and destination node, the source node managing value in the originating form, the destination node managing value in its delivery form, the bridge affecting value conversion for transactions that traverse the bridge.

13. The method of claim 12, wherein the out of band path acts an aggregation function to restore inventory consumed by one or more transactions in the principal bridging path.

14. The method of claim 13, wherein the out of band path uses institutional B2B networks to supplement the liquidity of a P2P principal bridging path.

15. The method of claim 1, wherein a sequence of transactions in the out of band path is altered to permit asynchronous operations to supplement principal bridging path liquidity.

16. The method of claim 12, wherein conversion transactions that exceed available liquidity from the principle bridging path are routed directly via the out of band path to facilitate conversion.

17. The method of claim 1, wherein lending operations are used in the out of band path to supplement the liquidity of the principle bridging path.

18. The method of claim 1, wherein put options are purchased by to offset volatility risk of assets used to facilitate transfers between the source and destination networks.

19. The method of claim 12, wherein bridge node inventory management is accomplished using liquidity supply and demand parameters.

20. A computing system for interfacing heterogenous computing networks to accomplish a method cross-network transaction in a system consisting of multiple networks, the system comprising:
at least one computer processor; and
at least one memory operatively coupled to the at least on processor and storing instructions thereon which, when executed by the at least one computer processor, cause the at least one computer processor to carry out the method comprising:
receiving information proposing a transaction that spans at least two networks and has a source node and a destination node;
traversing a graph structure, the graph structure including transaction nodes within transfer networks and bridges that span networks and being created by a multi-agent system that crawls the networks to identify a path between the source node and the destination node using nodes and bridges, wherein, each nodes in the graph structure exists on a network and each have an associated set of attribute variables, the attribute variables specifying supported tokens, and a bridge path defined by two nodes spanning two logical networks, the bridge path having attribute variables representing transmission characteristics wherein the source node and the destination node are also connected via one or more out of band network paths which are separate from the bridge path, the one or more out of band paths consisting of one or more network paths that are independent of the bridging path;
generating transaction routing information specifying a set of sub-transactions for executing the transaction based on the graph structure, the information including the anticipated cost and time of the transaction if the route is used; and
controlling execution of the set of sub-transactions using a manager that executes and controls the sequencing of execution of the sub-transactions across heterogeneous networks, ensures and records successful execution of the full chain, and executes rollback if the transaction fails.

21. The system of claim 20, wherein at least one of the one or more out of band paths are defined by traversing a graph structure, the graph structure including transaction nodes within transfer networks and bridges that span networks and being created by a multi-agent system that crawls the networks to identify a path between the source node and the destination node using nodes and bridges, wherein, each node in the graph structure exists on a network and each have an associated set of attribute variables, the attribute variables specifying supported tokens, and a bridge path defined by two nodes spanning two logical networks, the bridge path having attribute variables representing transmission characteristics.

22. The system of claim 21, wherein the generating includes determining transfer paths based on the transaction routing information, the transfer paths including the set of sub-transactions, the determining including inspecting a catalog of transfer messaging terms and a translation schema to convert heterogeneous ontologies of DLT networks in the optimized transfer path to a syntax-independent model and modeling the sub-transactions according to the syntax-independent model and applying interfaces between the DLT networks in the optimized transfer paths.

23. The system of claim 20, wherein pairs of nodes in the graph structure and the corresponding sets of attribute variables define a bridge data structure providing linkage between the nodes in the pairs of nodes.

24. The system of claim 23, wherein at least some of the pairs of nodes correspond to accounts in different networks.

25. The system of claim 23, wherein the bridge data structure specifies, at least one source network wallet, at least one destination network wallet, and transaction pricing models for value flowing between nodes in the pair of nodes.

26. The system of claim 23, wherein the bridge data structure specifies transformation logic to be attached to the logical interfaces.

27. The system of claim 20, wherein the generating comprises traversing the graph structure in accordance with a node traversing algorithm and parsing the attribute variables to identify acceptable routes.

28. The system of claim 20, wherein each node is wrapped with a common transaction interface that translates syntax independent instructions to the specific network syntax to enable transaction execution on dissimilar networks.

29. The system of claim 20, wherein the method further comprises publishing the transaction and the linkage to each sub-transaction to an independent ledger.

30. The system of claim 20, wherein the published transaction uses a Zero Knowledge Proof to provide immutability while maintaining transaction privacy.

31. The system of claim 20, wherein the bridge path is used for a conversion transaction in which a transfer that results in the changing of one form of value to another, wherein the bridge data structure contains a source node and destination node, the source node managing value in the originating form, the destination node managing value in its delivery form, the bridge affecting value conversion for transactions that traverse the bridge.

32. The system of claim 31, wherein the out of band path acts an aggregation function to restore inventory consumed by one or more transactions in the principal bridging path.

33. The system of claim 32, wherein the out of band path uses institutional B2B networks to supplement the liquidity of a P2P principal bridging path.

34. The system of claim 20, wherein a sequence of transactions in the out of band path is altered to permit asynchronous operations to supplement principal bridging path liquidity.

35. The system of claim 31, wherein conversion transactions that exceed available liquidity from the principle bridging path are routed directly via the out of band path to facilitate conversion.

36. The system of claim 20, wherein lending operations are used in the out of band path to supplement the liquidity of the principle bridging path.

37. The system of claim 20, wherein put options are purchased by to offset volatility risk of assets used to facilitate transfers between the source and destination networks.

38. The system of claim 21, wherein bridge node inventory management is accomplished using liquidity supply and demand parameters.

* * * * *